(12) United States Patent
Silverman et al.

(10) Patent No.: US 7,377,551 B2
(45) Date of Patent: May 27, 2008

(54) COLLAPSIBLE SNOWBOARD POLE

(75) Inventors: Jon Silverman, River Drive Center 3, 611 River Dr., 4th, Park Ridge, NJ (US) 07656; Guy Barretta, 155 Washington St., Jersey City, NJ (US) 07302; Jason Billig, Mount Vernon, NY (US)

(73) Assignees: Jon Silverman, Wyckoff, NJ (US); Guy Barretta, Garwood, NJ (US)

( * ) Notice: Subject to any disclaimer, the term of this patent is extended or adjusted under 35 U.S.C. 154(b) by 0 days.

(21) Appl. No.: 11/304,113

(22) Filed: Dec. 14, 2005

(65) Prior Publication Data

US 2006/0273570 A1    Dec. 7, 2006

Related U.S. Application Data

(60) Provisional application No. 60/635,754, filed on Dec. 14, 2004.

(51) Int. Cl.
    *A63C 11/22*    (2006.01)
    *A63C 11/00*    (2006.01)
    *B62M 27/00*    (2006.01)
    *B62M 29/00*    (2006.01)
    *A45B 1/02*     (2006.01)

(52) U.S. Cl. .................. 280/819; 280/809; 280/816; 280/823; 280/14.21; 280/14.22; 280/14.23; 280/14.24; 280/14.25; 280/14.26; 280/14.27; 280/14.28; 135/77; 135/80; 135/81; 135/82; 135/83; 135/84

(58) Field of Classification Search ................ 280/809, 280/819, 816, 823, 14.21, 14.22, 14.23, 14.24, 280/14.25, 14.26, 14.27, 14.28; 135/77, 135/80, 82, 83, 84, 81

See application file for complete search history.

(56) References Cited

U.S. PATENT DOCUMENTS 2,620,210 A * 12/1952 Wüster ...................... 403/327

(Continued)

*Primary Examiner*—Christopher P. Ellis
*Assistant Examiner*—John R. Olszewski
(74) *Attorney, Agent, or Firm*—Kramer Levin Naftalis & Frankel LLP

(57) ABSTRACT

A collapsible snowboard pole is presented. In exemplary embodiments of the present invention a snowboard pole can be provided with a manually expandable and compressible shaft, a basket at the tip, and a handle at the top. The basket can slide between a lower tip-ward (distal) position for storage and an upper top-ward (proximal) position for use. In exemplary embodiments of the present invention the pole can be expanded to full length and disengaged from a docking mechanism located at the back of a snowboard with one hand, while a user is in motion on the snowboard. Once disengaged, the user can easily deploy the basket to its full upward extension for use. Additionally, a user can dock a collapsed pole and secure it in a docking mechanism, or can insert the pole tip in a docking mechanism, then collapse the pole and then secure it in the docking mechanism, all with one hand while in motion on the snowboard.

20 Claims, 41 Drawing Sheets

U.S. PATENT DOCUMENTS

| | | | | |
|---|---|---|---|---|
| 3,076,663 | A * | 2/1963 | Scott | 280/824 |
| 4,411,284 | A * | 10/1983 | Opitz | 135/81 |
| 5,961,387 | A * | 10/1999 | Parsons | 463/47.7 |
| 6,015,165 | A * | 1/2000 | Artemis et al. | 280/824 |
| 6,203,064 | B1 * | 3/2001 | Zaltron | 280/824 |
| 6,217,073 | B1 * | 4/2001 | Hoffman | 280/823 |
| 6,345,843 | B1 * | 2/2002 | Barnes | 280/823 |
| 6,923,455 | B2 * | 8/2005 | Sullivan | 280/14.27 |
| 2002/0096842 | A1 * | 7/2002 | Chang et al. | 280/7.12 |
| 2002/0180169 | A1 * | 12/2002 | Kwok | 280/87.041 |
| 2004/0007837 | A1 * | 1/2004 | Sullivan | 280/14.27 |

* cited by examiner

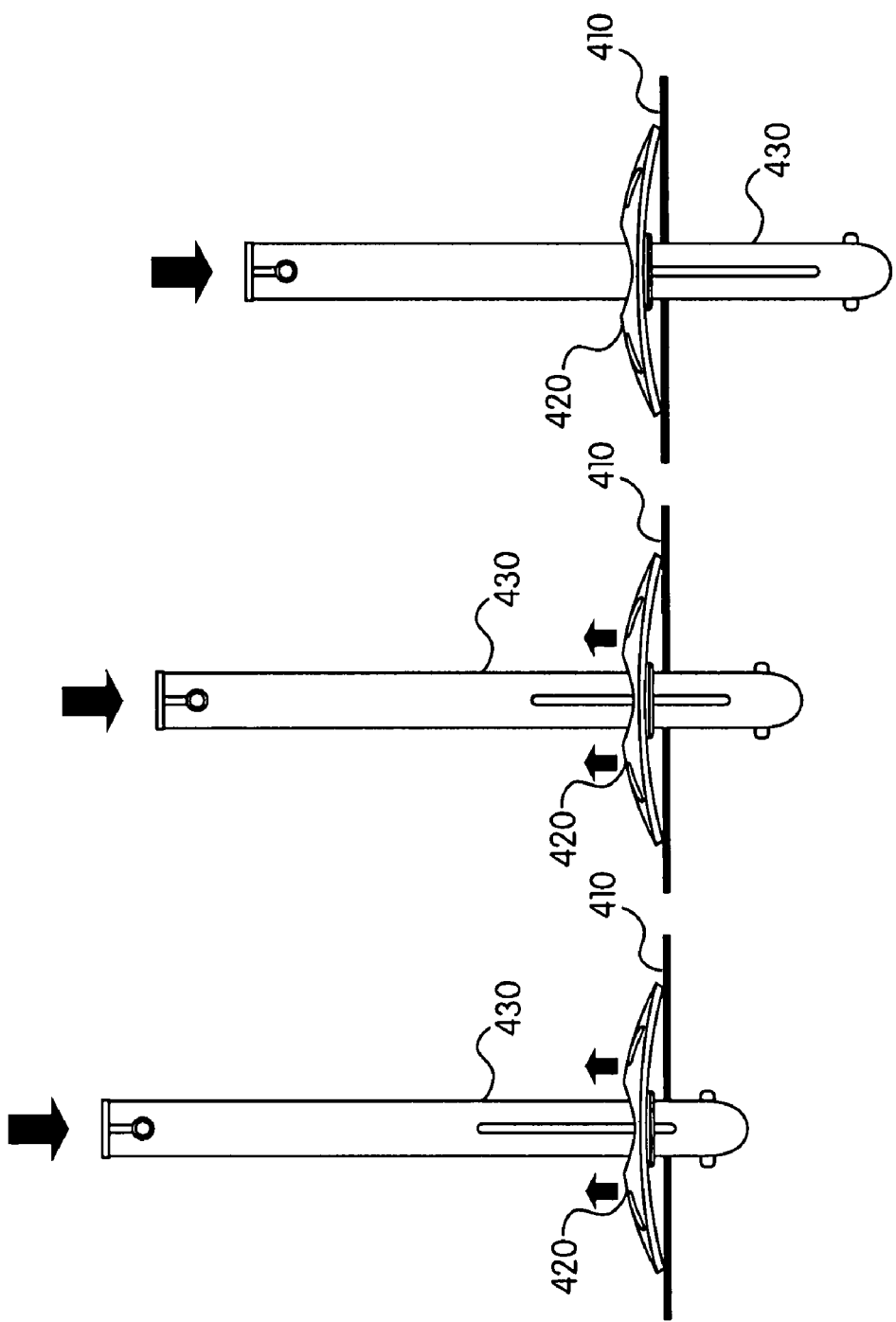

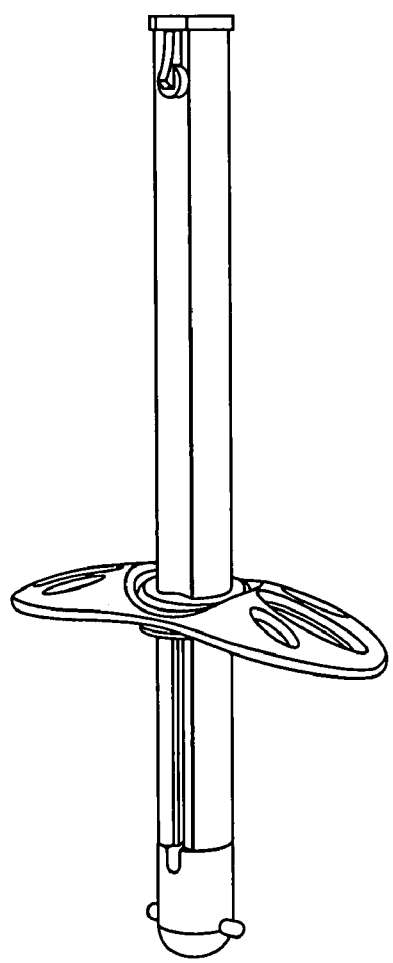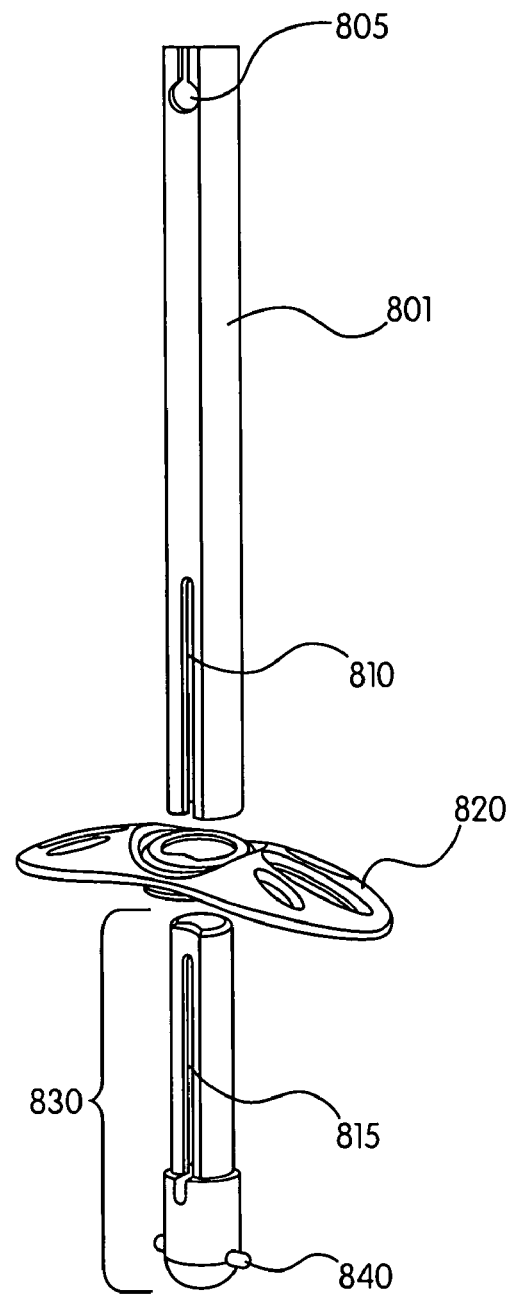
FIG. 8(a)
FIG. 8(b)

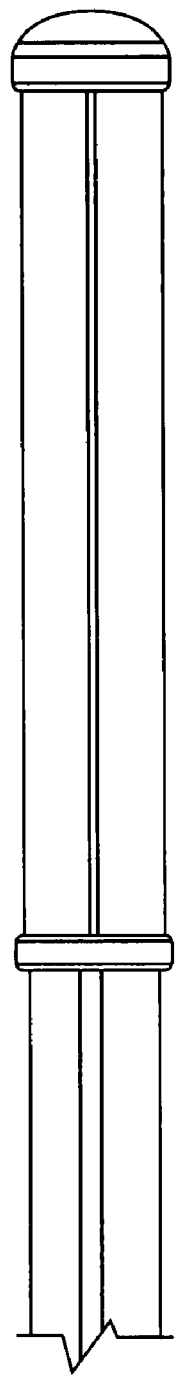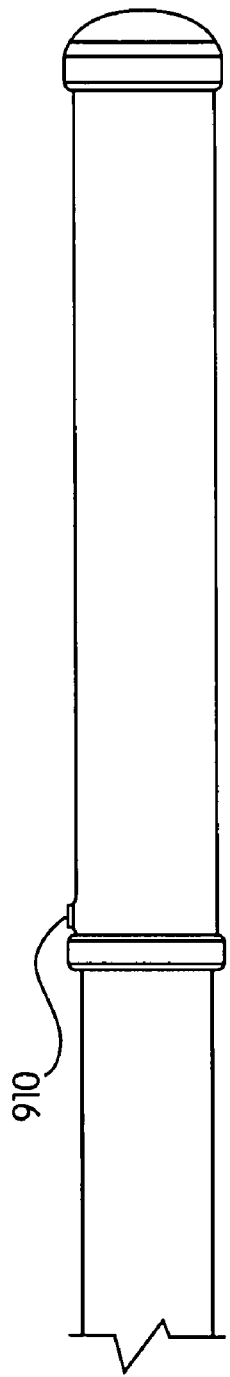
FIG. 9(a)
FIG. 9(b)
910

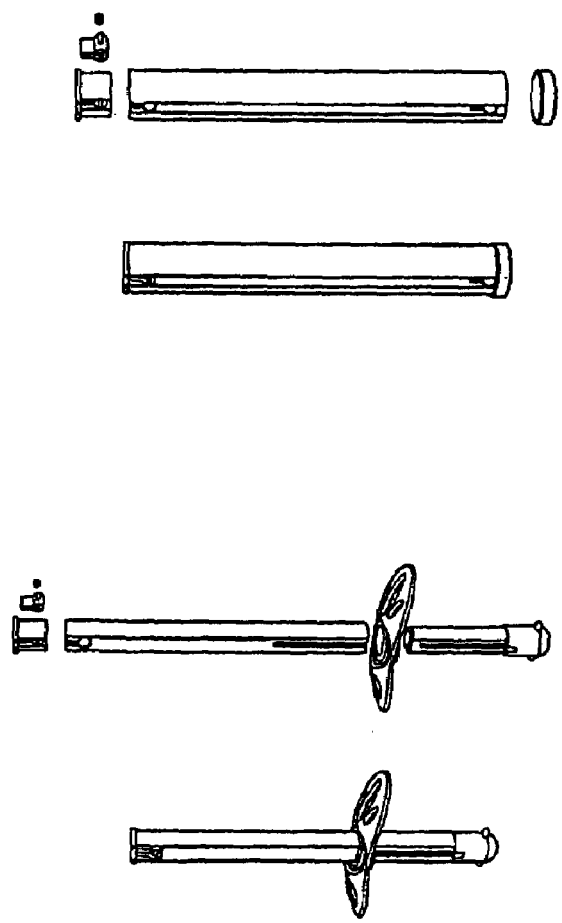
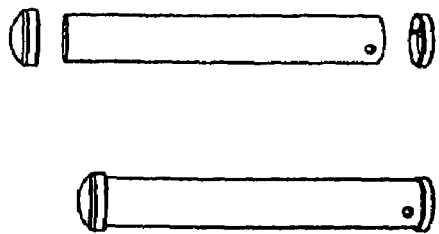
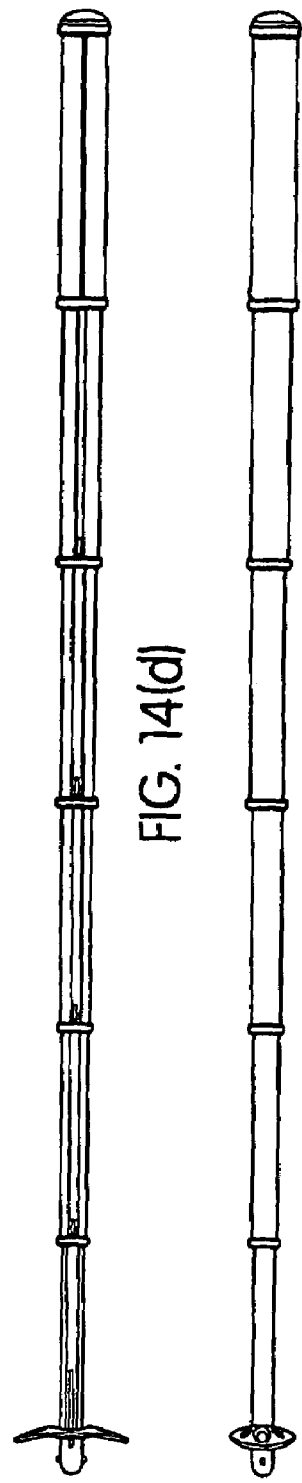
FIG. 14(a) FIG. 14(b) FIG. 14(c) FIG. 14(d) FIG. 14(e)

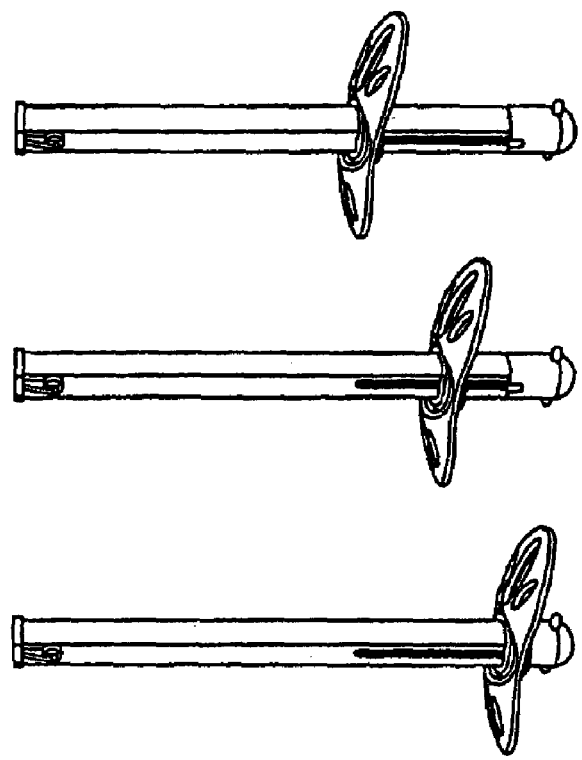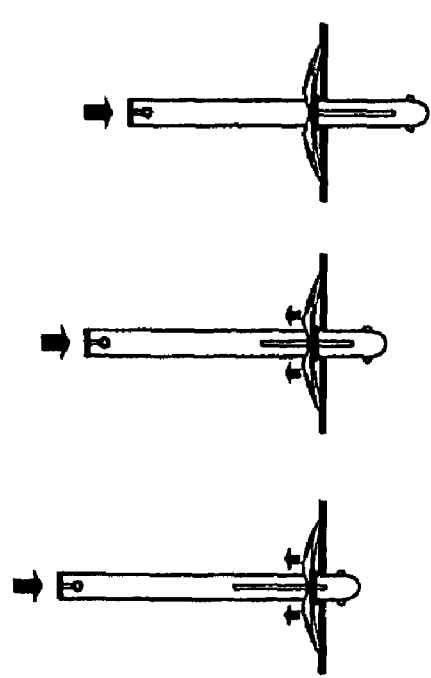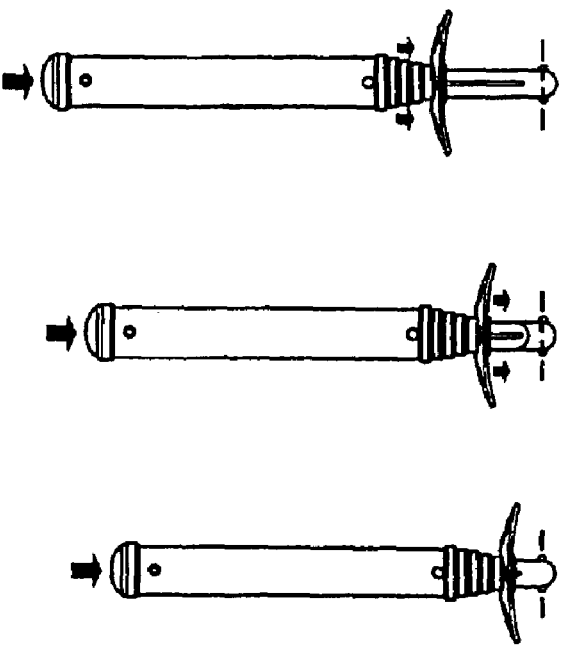

COLLAPSIBLE SNOWBOARD POLE

CROSS-REFERENCE TO OTHER APPLICATIONS

This application claims the benefit of U.S. Provisional Patent Application No. 60/635,754, filed on Dec. 14, 2004, which is hereby incorporated herein by this reference.

TECHNICAL FIELD

The present invention relates to snowboards, and more particularly to low-footprint easily accessible poles for snowboards.

BACKGROUND OF THE INVENTION

Snowboarders generally do not use poles as skiers do. Due to the variety of air maneuvers often performed by snowboarders, being forced to continually hold the equivalent of a ski pole is often too cumbersome to be practical. There are instances, however, when a snowboarder cannot simply move himself with both feet on the snowboard. This occurs when the snowboarder is on a flat, or nearly flat (i.e., slightly inclined either upward or downward) grade. In these instances a snowboarder has to unbuckle his boot and use one foot, generally his back foot, to push on the snow. This frequently occurs when having to traverse a mountain (as when on a lift line) or when disembarking from a chairlift. Thus, notwithstanding its general cumbersomeness, there are many instances when a pole or similar device would be useful to a snowboarder and allow him to increase his speed and/or maneuverability.

There are few, if any, commercially available snowboard poles. While it is possible to use ski poles, this forces the snowboarder to hold the pole or poles continually while snowboarding. This is contrary to the flow and feel of snowboarding, inasmuch as poles are generally not needed when traveling down an incline, and they simply get in the way.

While there have been some attempts at creating snowboard poles that can be attached to either snowboards or to the lower legs of snowboard users while not in use, these utilize cumbersome attachment mechanisms and do not allow for both convenient access and deployment of the snowboard pole as well as convenient and low-footprint storage of the pole when not in use by a snowboarder while he or she is on the snowboard and moving.

Thus, what is needed in the art is a pole for a snowboard that can be conveniently and quickly accessed and deployed when needed whole on a moving snowboard, and that can also be conveniently stowed while on a moving snowboard when not.

SUMMARY OF THE INVENTION

A collapsible snowboard pole is presented. In exemplary embodiments of the present invention a snowboard pole can be provided with a manually expandable and compressible shaft, a basket at the tip, and a handle at the top. The basket can slide between a lower tip-ward (distal) position for storage and an upper top-ward (proximal) position for use. In exemplary embodiments of the present invention the pole can be expanded to full length and disengaged form a docking mechanism located at the back of a snowboard with one hand, while a user is in motion on the snowboard. Once disengaged, the user can easily deploy the basket to its full upward extension for use. Additionally, a user can dock a collapsed pole and secure it in a docking mechanism, or can insert the pole tip in a docking mechanism, then collapse the pole and then secure it in the docking mechanism, all with one hand while in motion on the snowboard.

BRIEF DESCRIPTION OF THE DRAWINGS

FIG. 4 depict deploying the basket as depicted in FIG. 3 in the context of the surface of an exemplary snow surface;

FIGS. 8(a)-(b) show a bottom section of an exemplary snowboard pole according to an exemplary embodiment of the present invention in assembled and expanded views.

FIG. 9 show the top section of an exemplary snowboard pole according to an exemplary embodiment of the present invention in the fully extended pose;

FIGS. 14(a), (b) and (c) each show expanded views of the bottom, middle, and top sections, respectively, of an exemplary snowboard pole according to an exemplary embodiment of the present invention;

FIGS. 14(d)-(e) show top and side views, respectively, of a fully extended exemplary snowboard pole according to an exemplary embodiment of the present invention;

FIGS. 15(a)-(c) are a series of side views depicting the deployment of the basket of an exemplary snowboard pole according to an exemplary embodiment of the present invention;

FIGS. 15(g), (e), and (d), respectively, show the operation of collapsing an exemplary snowboard pole and its basket for storage according to an exemplary embodiment of the present invention;

FIGS. 15(g), (h), and (i) are expanded, in perspective views, of the basket moving upward along its grooves shown in FIGS. 15(a)-(c);

It is noted that the patent or application file contains at least one drawing or photograph executed in color. Copies of this patent or patent application publication with color drawings will be provided by the U.S. Patent Office upon request and payment of the necessary fee.

DETAILED DESCRIPTION OF THE INVENTION

In exemplary embodiments of the present invention a collapsible snowboard pole and base are provided. In exemplary embodiments of the present invention, the base can be a small device which can be attached to a convenient place on a snowboard. In exemplary embodiments of the present invention, a base can be attached to a snowboard just behind where a back boot is normally attached so that it can be out of a snowboarder's way. Alternatively, the base can be fully integrated with the snowboard for better strength, less parts to assemble and sleekness of appearance. In exemplary embodiments of the present invention, a base can be, for example, light enough so as not to impede a snowboarder's ability to jump or move. Such a base can, in exemplary embodiments, have an attachment mechanism, such as, for example, a clip device, so that it can hold a pole when the pole is not in use.

In exemplary embodiments of the present invention, the pole itself can be lightweight and collapsible, in one exemplary embodiment having a fully collapsed length of, for example, 8-12 inches, and a fully expanded length of, for example, anywhere from 2-4 feet. In exemplary embodiments of the present invention, in its collapsed state an exemplary pole can, for example, be attached to a docking mechanism or base and stored therein on the snowboard. In operation, for example, a snowboarder can reach down, release the handle of the pole from the base and extend it, and then disengage the basket from the docking mechanism. Or, for example, the pole can be totally disengaged from the base and then extended. Once disengaged, a user can, still with one hand, deploy the basket to a full upright position for use by, for example, pushing down on the extended pole in the snow. This operation can be automated in exemplary embodiments of the present invention, as described below.

An exemplary pole according to an exemplary embodiment of the present invention is next described with reference to various figures.

Figure 1A:
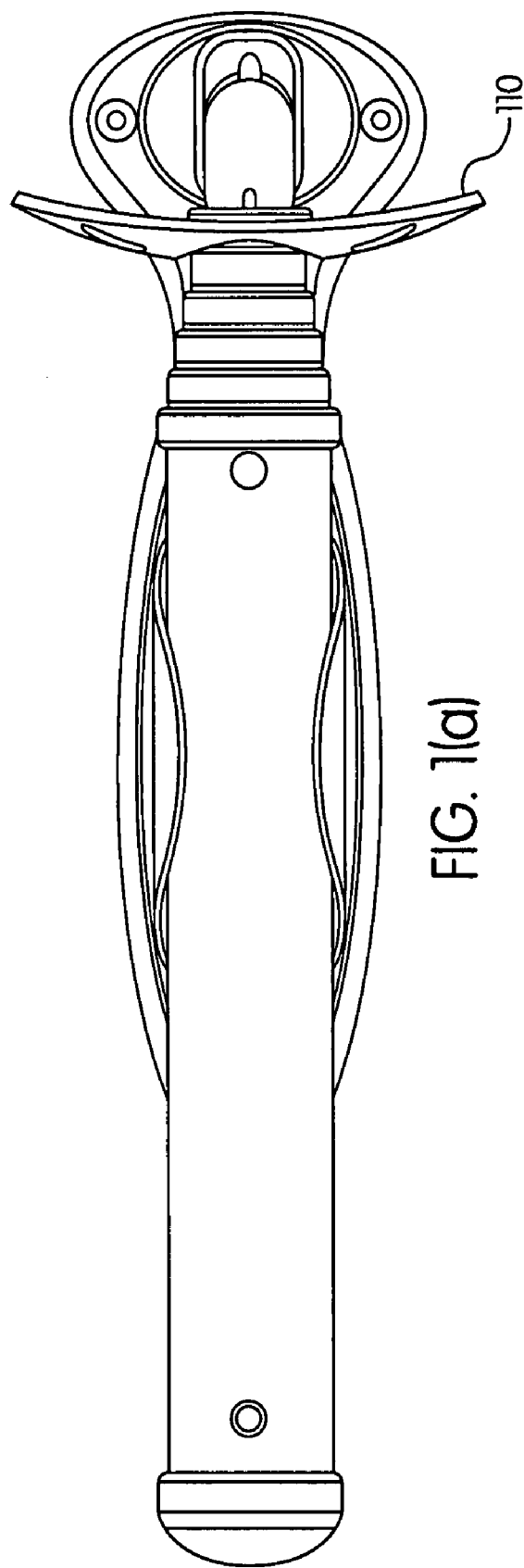
FIG. 1 depict an exemplary snowboard pole in its docking mechanism according to an exemplary embodiment of the present invention.
Figure 1B:
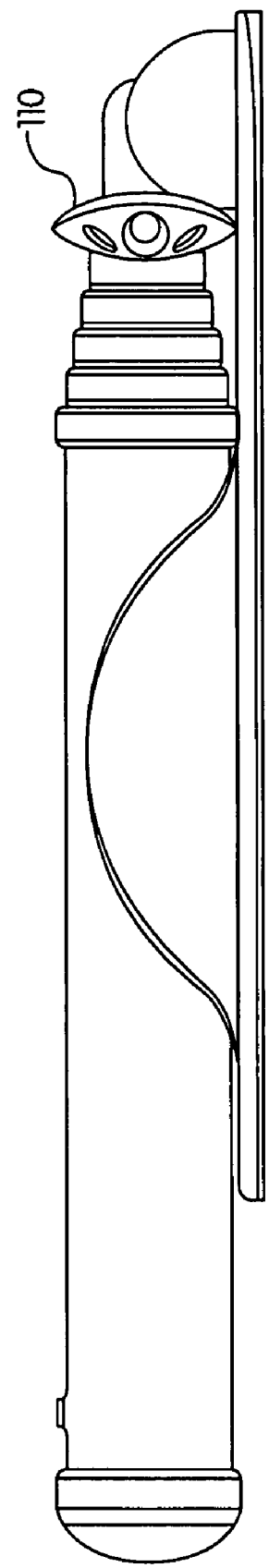
Figure 2:
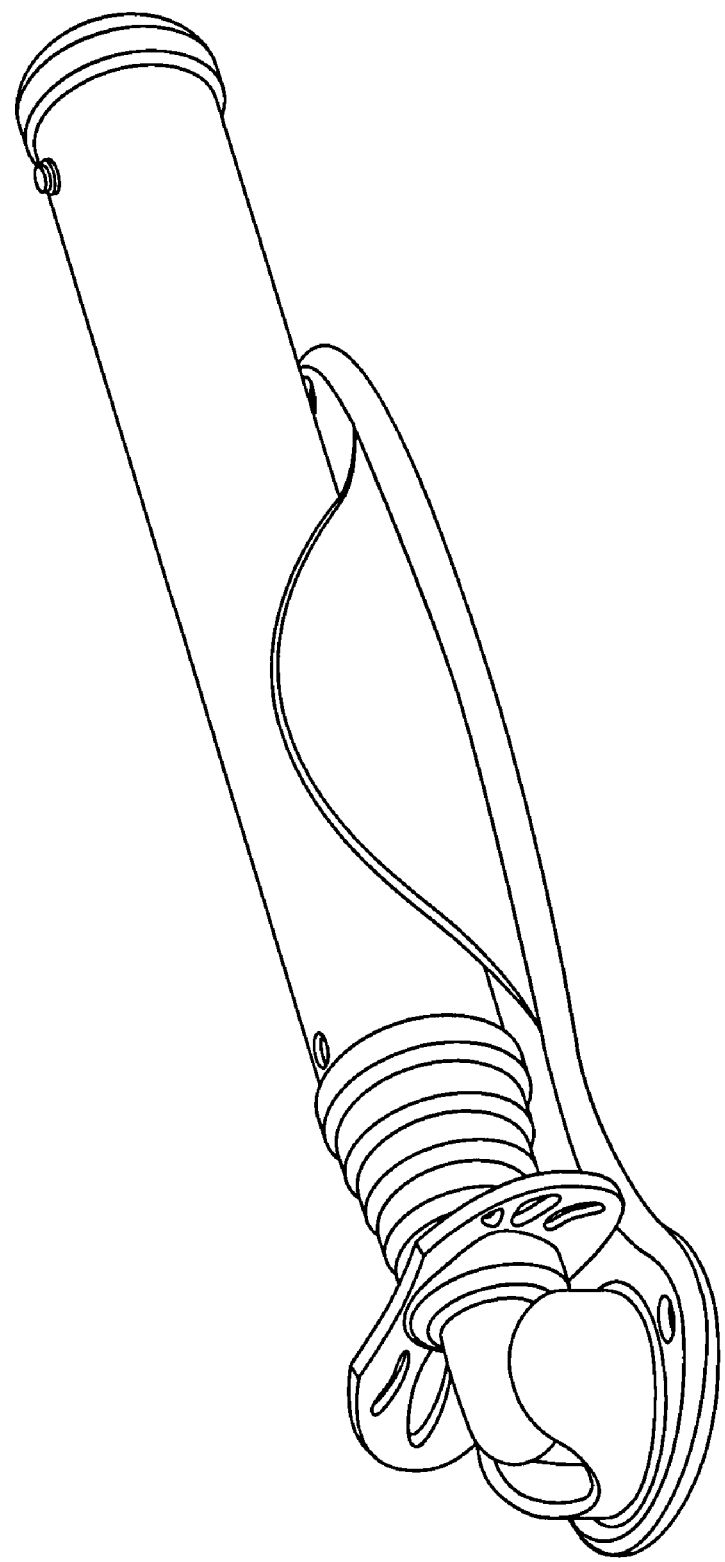
FIG. 2 depicts a perspective view of the exemplary snowboard pole of FIG. 1.
Figure 16:
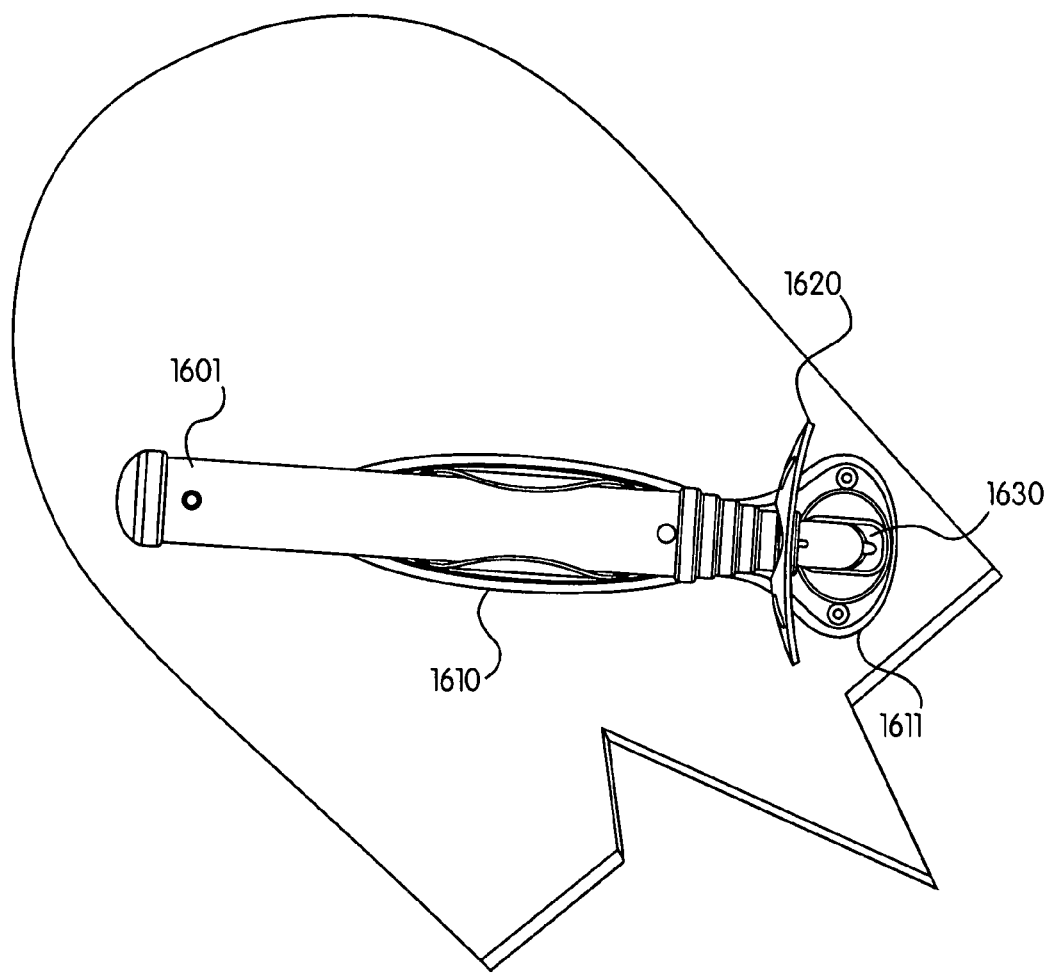
FIG. 16 depicts an exemplary snowboard pole in a docked position on an exemplary snowboard according to an exemplary embodiment of the present invention.
Figure 17:
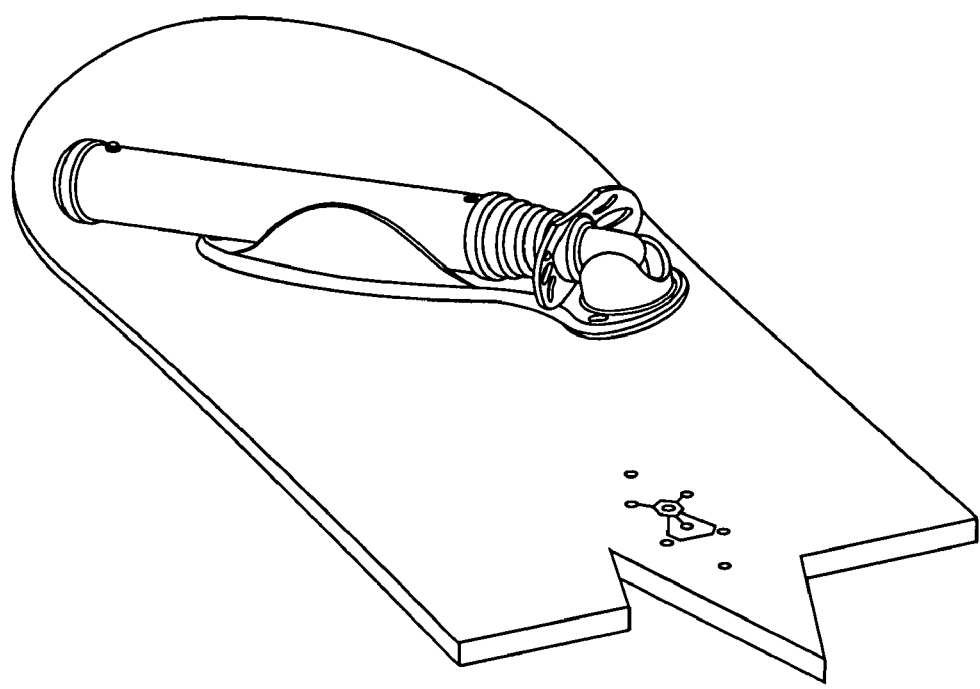
FIG. 17 depicts the exemplary pole of FIG. 16 in a similar view.
Figure 18:
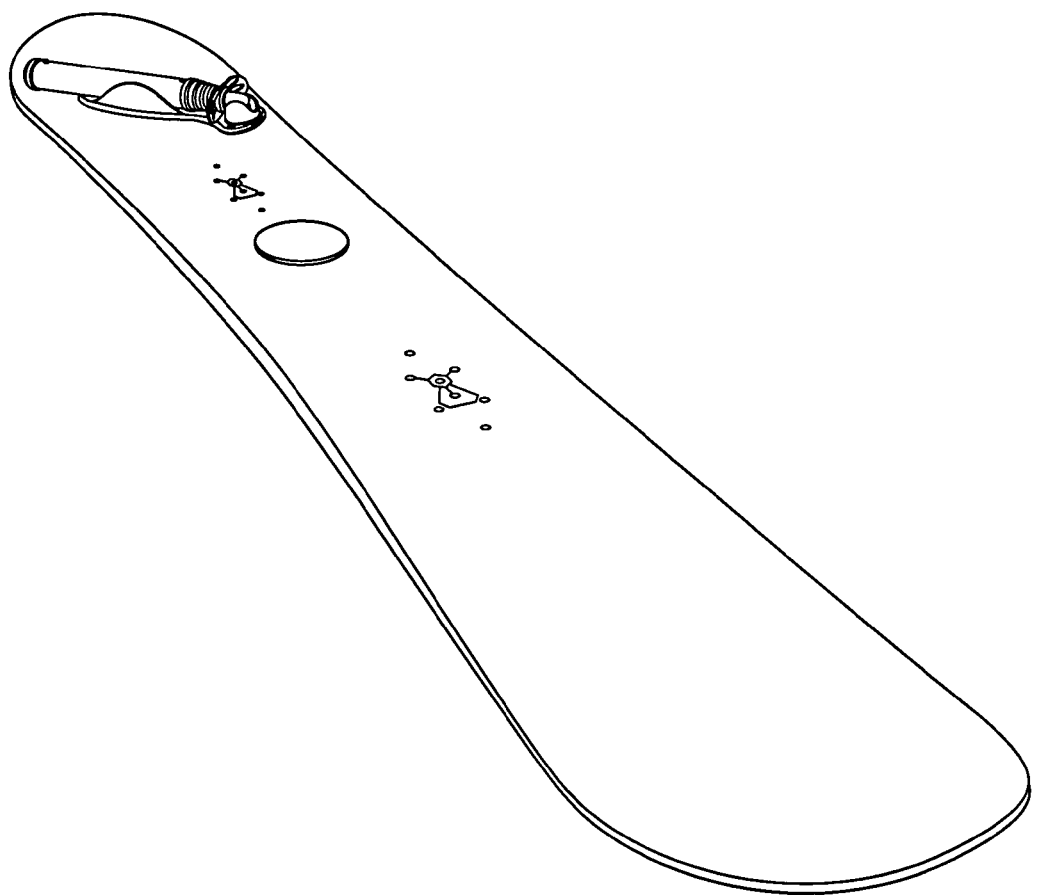
FIG. 18 depicts the exemplary snowboard pole of FIG. 17 in a perspective view showing the entire snowboard according to an exemplary embodiment of the present invention.
Figure 19:
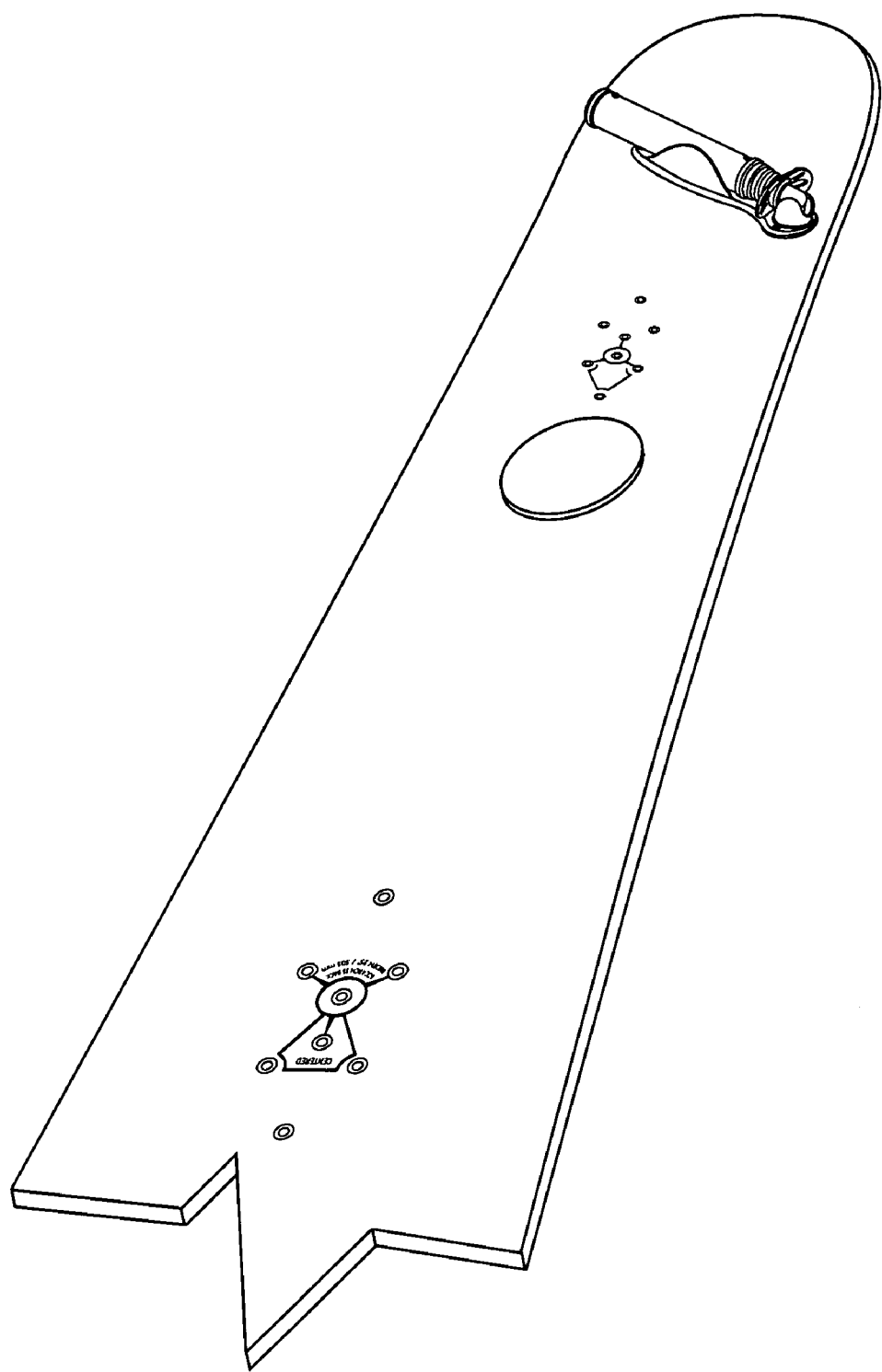
FIG. 19 is an alternative view of the exemplary snowboard pole of FIG. 18.

FIGS. 1(a)-(b) depict an exemplary snowboard pole according to an exemplary embodiment of the present invention in top and side views, respectively. The snowboard pole depicted in FIG. 1 is shown in a docked position, located for example, at the back of a snowboard, behind the rear boot. Because it is in a docked position, the pole is compressed and the basket 110 is in the forward (distal) position, where it is closest to the tip, as described more fully below. FIG. 2 depicts the exemplary docked snowboard pole of FIG. 1 in a perspective view. FIGS. 16 and 17 are similar views of an exemplary snowboard pole to that of FIG. 1(a), and FIGS. 18 and 19 are perspective views of the exemplary pole of FIG. 16-17 in a docked position, similar to the side view of FIG. 1(b) and the perspective view of FIG. 2 with the opposite left-right orientation (essentially a mirror-image view).

Figures 3A, 3B, 3C:
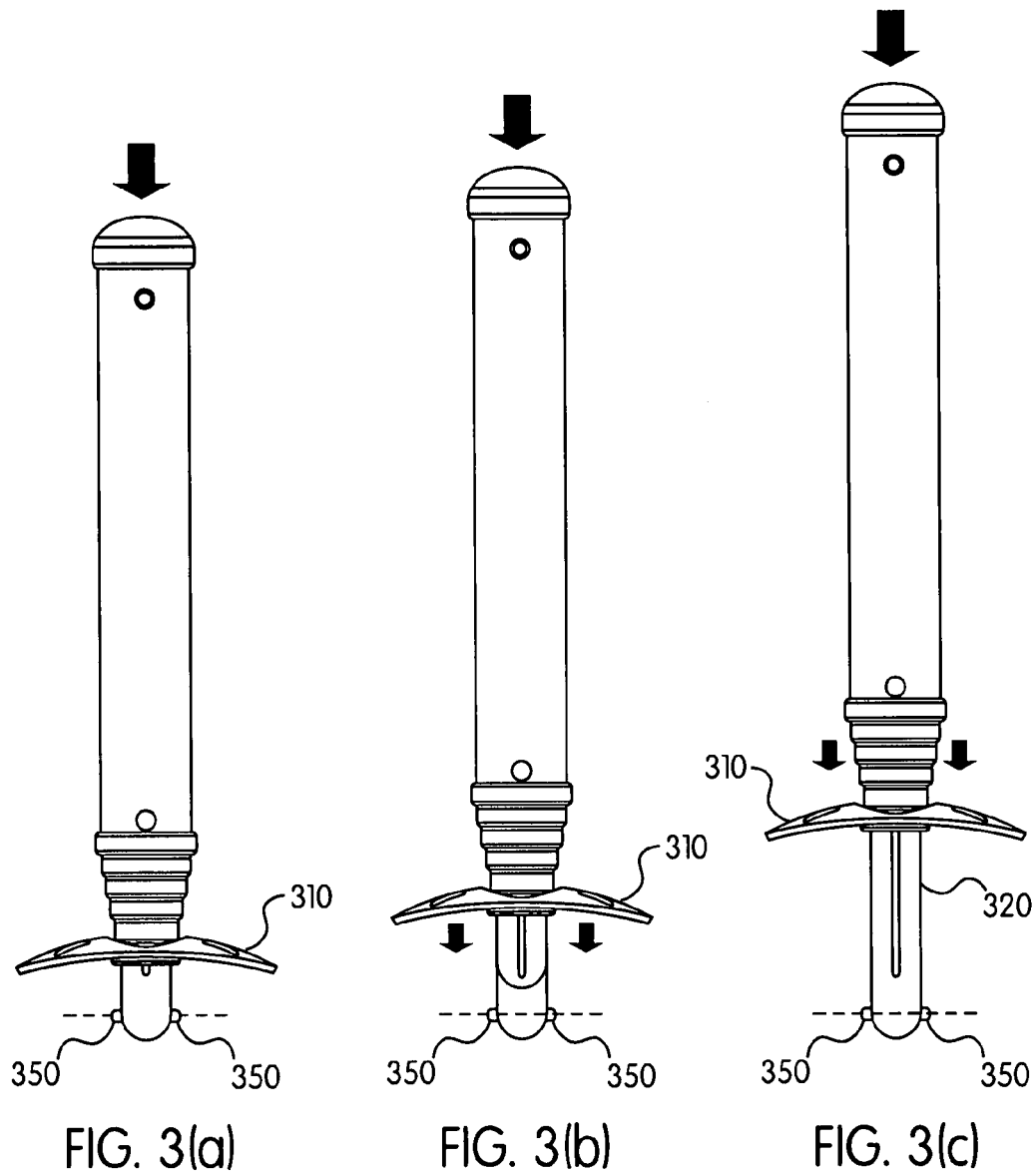
FIGS. 3(a)-(c) depict an exemplary snowboard pole of the present invention in three stages of deployment of the basket.
Figure 26:
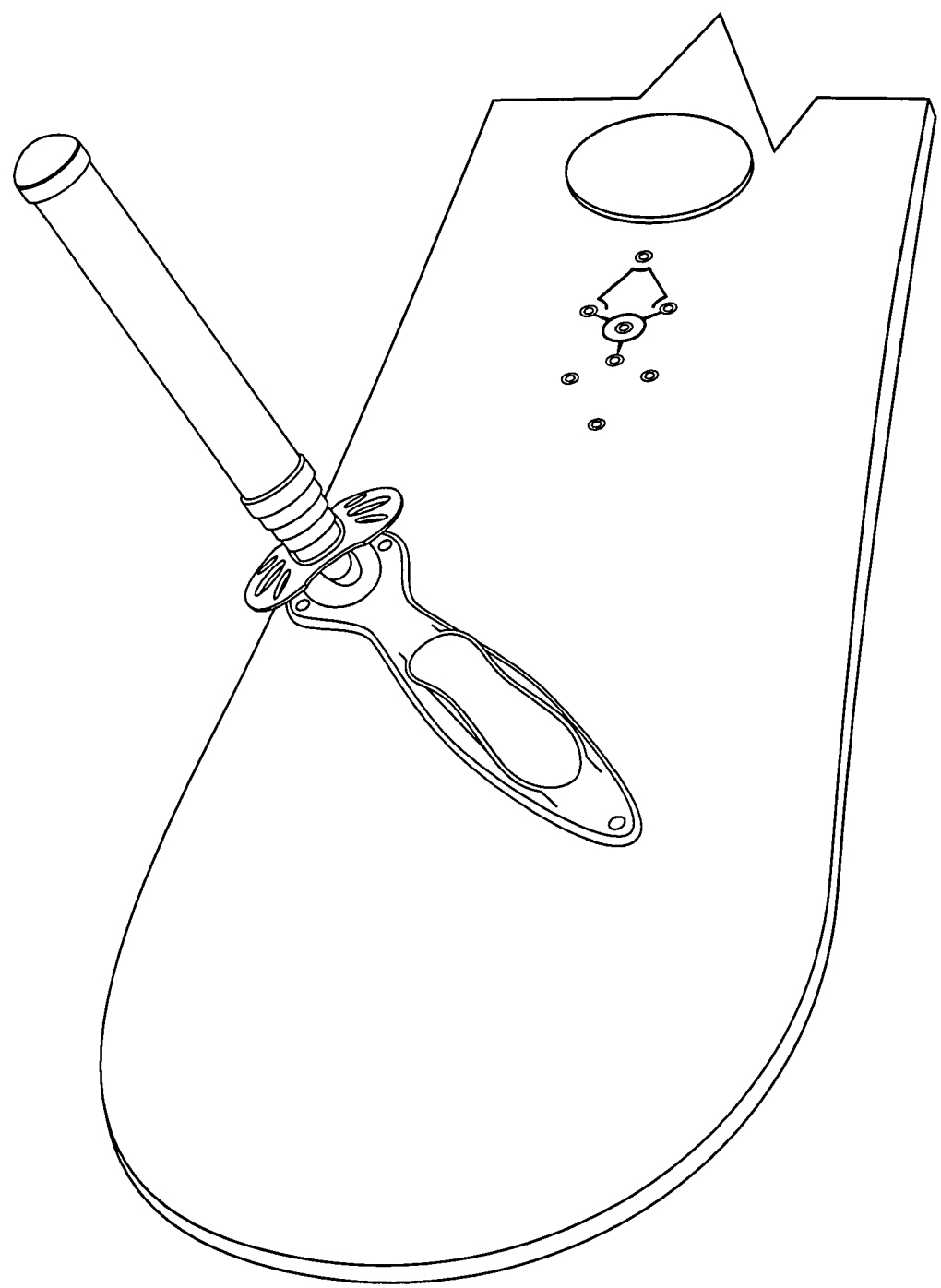
FIG. 26 depicts an exemplary snowboard pole in its collapsed state rotated upwards to a full vertical position in the docking mechanism but not yet rotated about its central axis so as to remove it from the docking mechanism according to an exemplary embodiment of the present invention.
Figure 27:
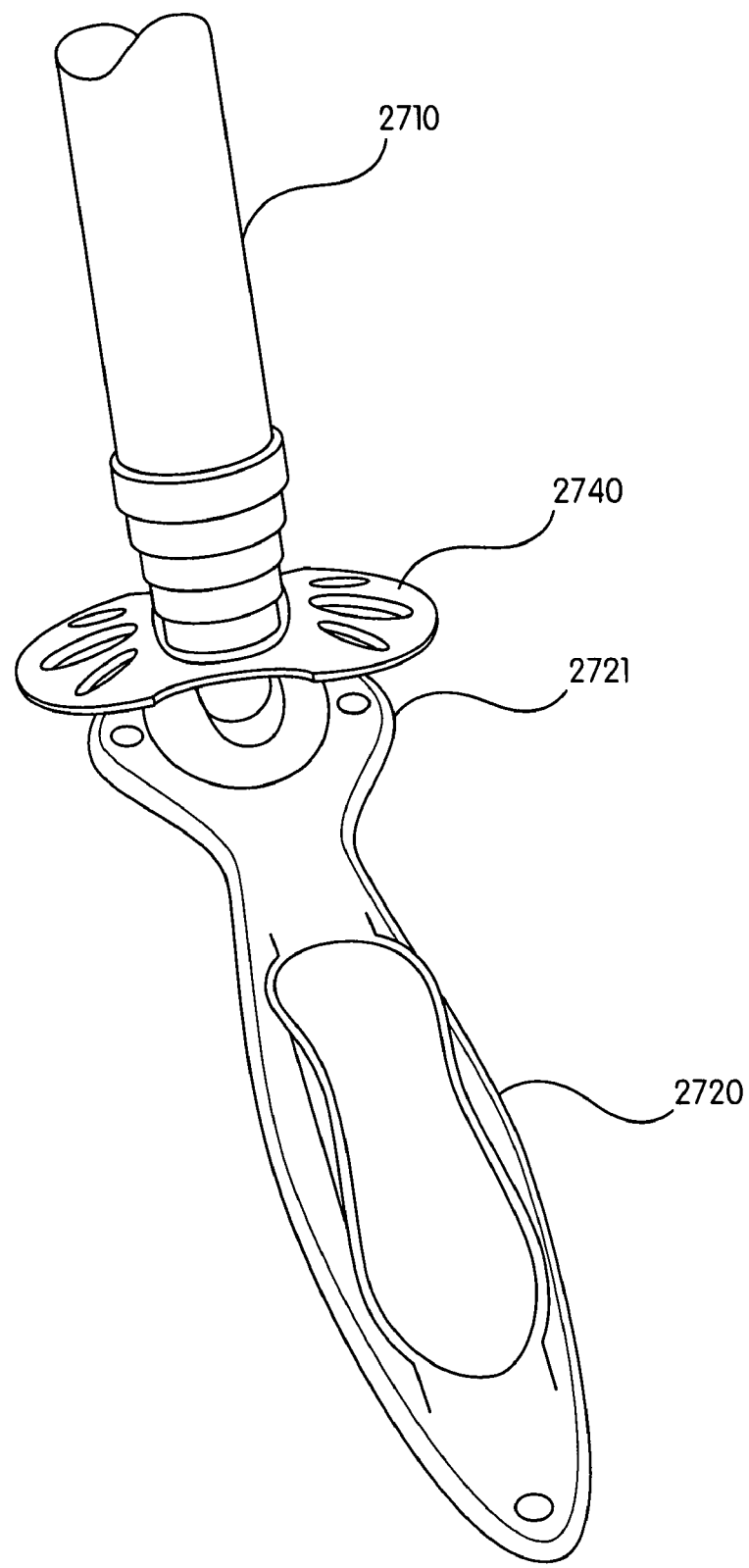
FIG. 27 is a close-up view of the exemplary snowboard pole depicted in FIG. 26.
Figure 28:
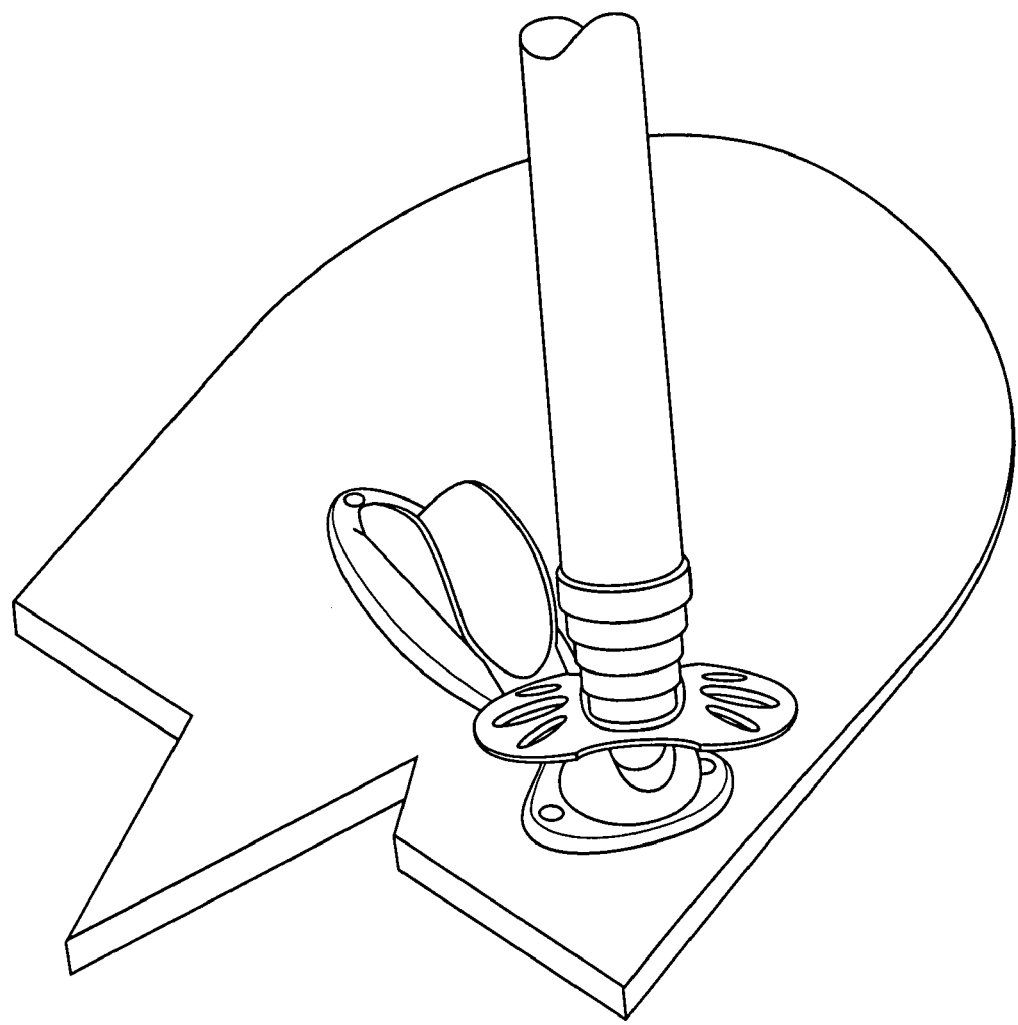
FIG. 28 depicts the exemplary snowboard pole of FIG. 27 from another direction.

FIGS. 3(a)-(c) depict three side views of an exemplary snowboard pole according to an exemplary embodiment of the present invention. FIGS. 3(a)-(c) show the exemplary snowboard pole in its final stages of being compressed for storage ("docking") on an exemplary snowboard. FIG. 3(c) shows the pole sections completely compressed except for the last (and thus most inner) tubular section 320 which still has some exposed length i.e., the bottom portion of the tube which has grooves to allow basket 310 to slide up and down. In FIG. 3(c), basket 310 is shown at its topmost position, which is where it generally sits during use. FIG. 3(b) depicts the basket having been pushed downward by the slider of the second to last section of the pole and the basket 310 therefore approximately one-half of the way down its vertical path to its lowermost (or distal) position where it is generally located during storage on a snowboard. Finally, in FIG. 3(a), as a user continues to push downward, basket 310 is pushed into its final position and the snowboard pole is thus shown in FIG. 3(a) as essentially completely collapsed. Also visible in FIG. 3 are tip locking prongs 350. In the docked configuration of the pole the tip locking prongs are fixed in a ring structure clamp, as described below, and as shown in FIGS. 26-28, where the pole has been rotated to lock the tip locking prongs into the ring structure of the clamp, as described more fully below.

With reference to FIGS. 4(a)-(c), the operation of an exemplary user deploying the basket from a collapsed state is depicted. This generally occurs after a pole has been disengaged from its docking and is prepared for use. This deployment can be accomplished, for example, by pushing on an extended pole into a snowy surface 410, as shown. With reference to FIG. 4(a) the basket is shown in its lower (distal) or tipmost position. This is generally the position that the basket is found in just after the snowboard pole has been removed from its docking on the snowboard. In order to render the pole usable, a user has to extend basket 420 stick the pole into the ground tip first and push, thus causing the basket to slide, along the provided grooves 430, upward to its uppermost (proximal) position (shown in FIG. 4(c)) where it can be used. With reference to FIG. 4(a), as the user pushes down on the snowboard pole with the tip embedded in the snow basket 420 begins to move upward. With reference to FIG. 4(b), an intermediate position in this operation is depicted with basket 420 having moved vertically approximately one-half of the way to its uppermost position. FIG. 4(c) illustrates the basket's final position, as the user continues to push the top of the snowboard pole downward into the snow.

Figure 5A:
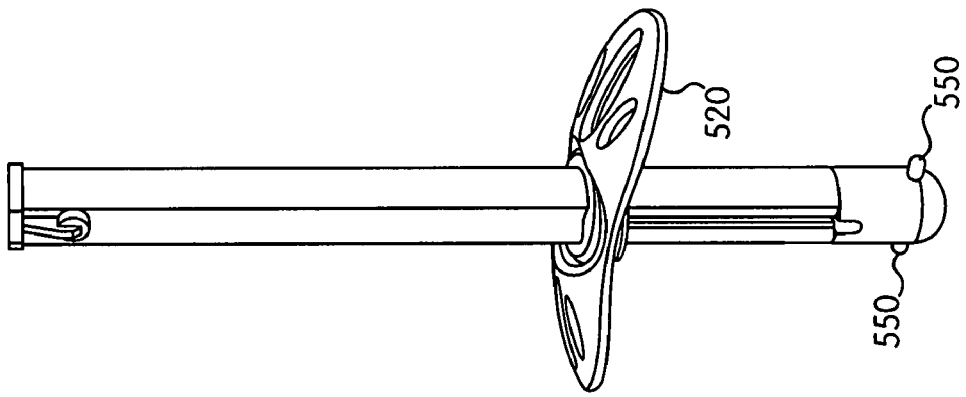
FIGS. 5(a)-(c) depict perspective views of the three stages of deployment of a basket of an exemplary snowboard pole according to an exemplary embodiment of the present invention.
Figure 5B:
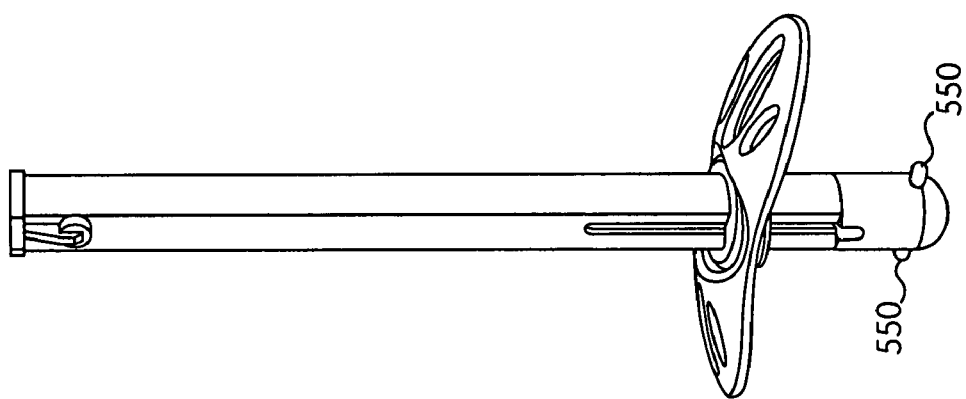
Figure 5C:
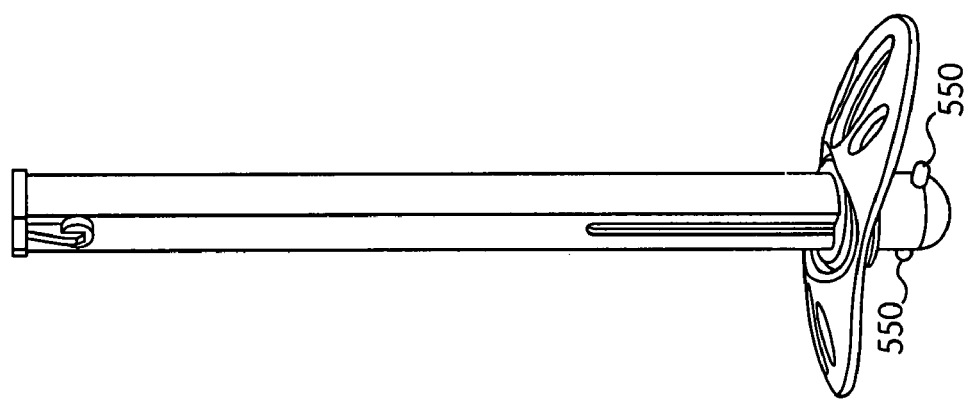

FIGS. 5(a)-(c) show perspective views of the final section of the snowboard pole and basket, corresponding to FIGS. 4(a)-4(c), respectively. FIG. 5(c) thus depicts the situation where basket 520 has been fully deployed to its uppermost (proximal) position. Also clearly visible at the bottom of the tip in FIG. 5 are tip locking prongs 550. These are used in docking the snowboard pole in an exemplary ring clamp structure of a docking mechanism according to an exemplary embodiment of the present invention, as described below.

Figure 29:
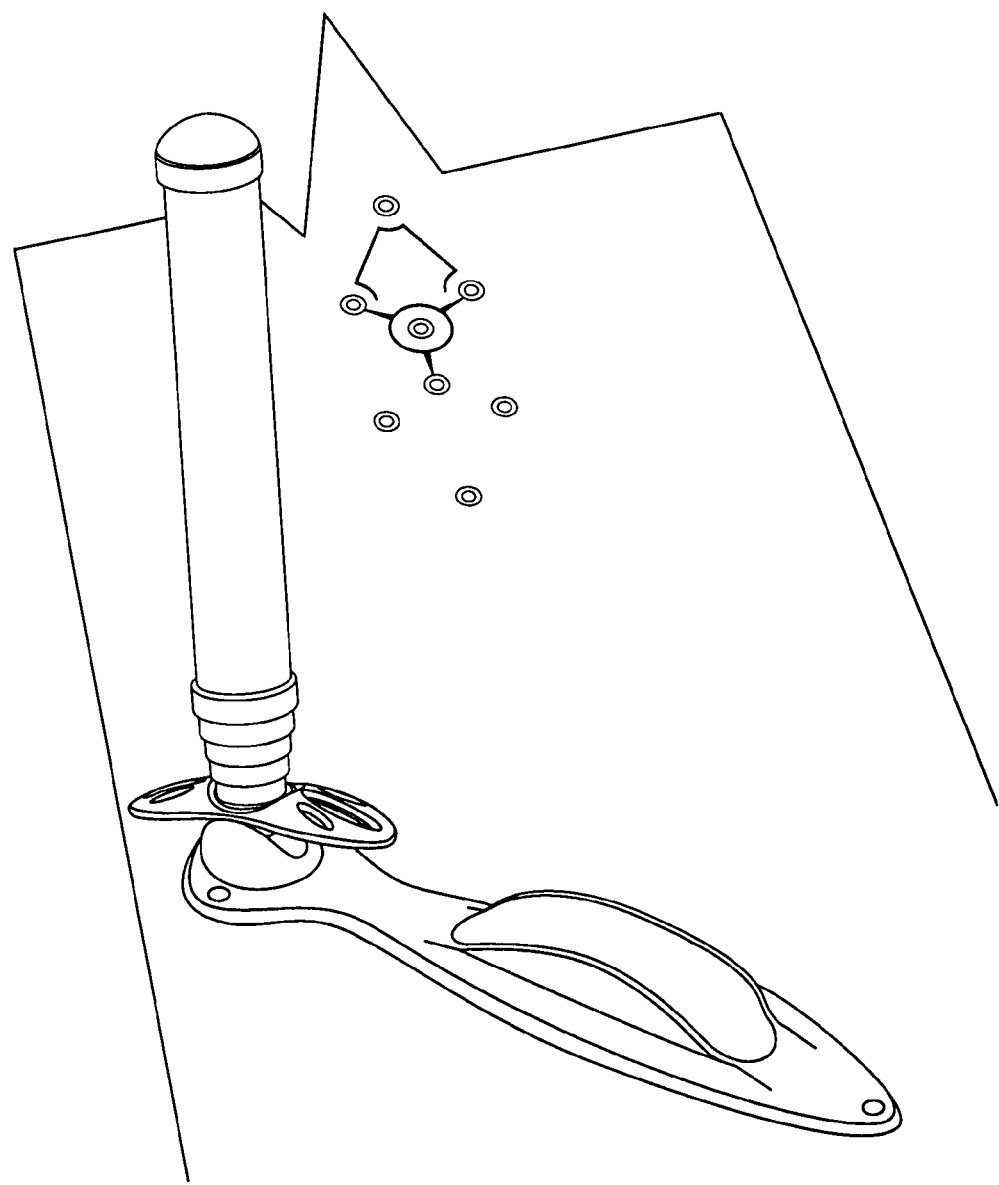
FIG. 29 depicts the exemplary snowboard pole of FIGS. 27 and 28, where the snowboard pole has now been rotated about its central axis so as to be removable from the docking mechanism, according to an exemplary embodiment of the present invention.
Figure 30:
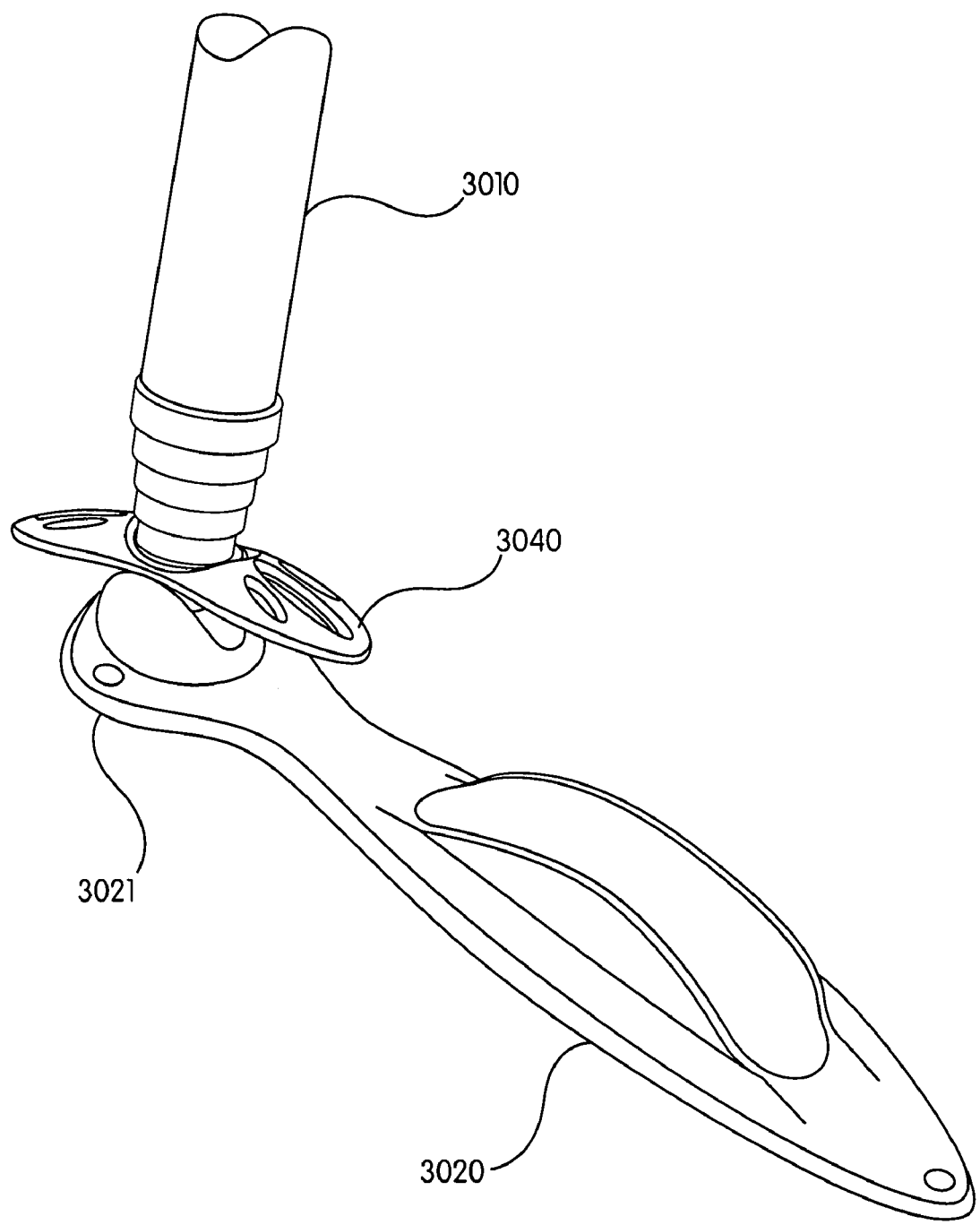
FIG. 30 is a detailed view of the exemplary snowboard pole of FIG. 29.
Figure 33:
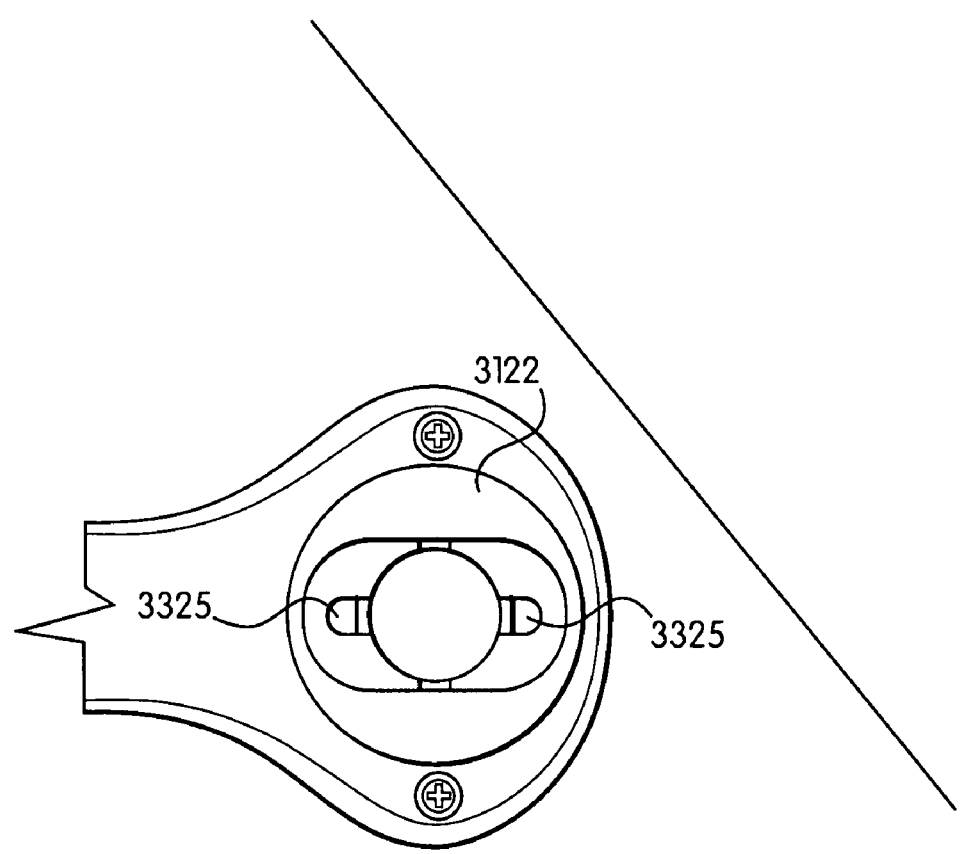
FIG. 33 is a detailed view of the docking portion of the exemplary docking mechanism of FIGS. 31 and 32 showing the groove structures and docking ring.

For example, as depicted in FIG. 33, an exemplary docking mechanism can have a ring structure. Such a ring structure can have, for example, a lower ring and an upper ring, each essentially planar and parallel to the snowboard, where the upper ring can have, for example, two sets of grooves 3325, where for example, each set of grooves consists of two grooves positioned 180 degrees apart from each other and the two sets are offset by, for example, 90 degrees, so that together they appear at clock face positions of 12, 3, 6 and 9 o'clock respectively. Tip locking prongs 550 can, for example, thus be free to rotate about the concentric axis of the pole within the space between the upper and lower rings while the pole is positioned at a substantially normal position to the surface of the snowboard. Each set of grooves can have two openings into which tip locking prongs 550 (with respect to FIG. 5) can fit. The grooves can, for example, be oriented such that tip locking prongs 550 can be inserted in one set of grooves oriented parallel to the longitudinal axis of the docking mechanism (as is shown in FIGS. 29 and 30), and when rotated 90 degrees the snowboard pole can stop, by means of a stopping mechanism provided between the rings, so as to fit within the second set of grooves, oriented perpendicular to such longitudinal axis (as shown in FIGS. 26-28). The function of such second set of grooves is to allow the pole tip to be vertically offset from the surface of the snowboard, so that is can be rotated downward without being obstructed by the ring housing, as described below.

In exemplary embodiments of the present invention, a pole, when docked and so as to be within the second set of grooves (as shown in FIGS. 26-28), can be free to move a small distance vertically upward so that the pole handle can be rotated downward to sit substantially tangent to the snowboard surface without the tip of the pole being restricted by the ring housing. It is noted that such latter rotation is about a line which runs through the two tip locking prongs and thus such line is perpendicular to the longitudinal axis of an exemplary docking mechanism, as described below. If this axis was not allowed to be at some distance above the plane at which the tip locking prongs originally entered the to reach the first set of grooves (i.e., if the second set of grooves did not extend upward and thus allow for vertical motion of the pole while the tip locking prongs were within said second set of grooves), this rotation of the pole handle would not be possible.

In exemplary embodiments of the present invention a snowboard pole can be constructed of multiple concentric cylindrical hollow sections which can fit one inside the other so as to be capable of telescoping. Such sections can be constructed of any relatively light yet strong material such as, for example, metal (e.g., aluminum, steel, etc.), carbon fiber, etc. Such sections can, for example, have grooves provided longitudinally along at least one side of each section so as to allow lateral movement of the sections relative to one another but to also prohibit any relative rotational motion. With reference to FIGS. 6-8, in an exemplary embodiment of the present invention using such concentric cylindrical sections, various sections of an exemplary snowboard pole according to the present invention will next be described.

Figure 6A:
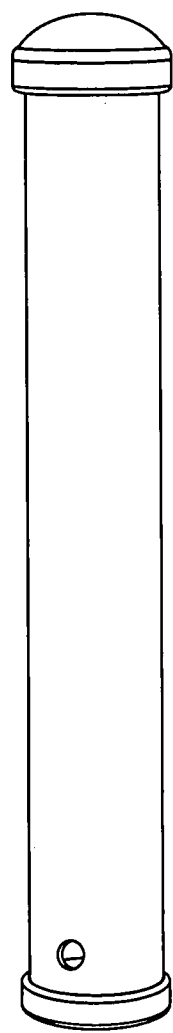
FIGS. 6(a)-(b) depict the top section of an exemplary snowboard pole according to an exemplary embodiment of the present invention.
Figure 6B:
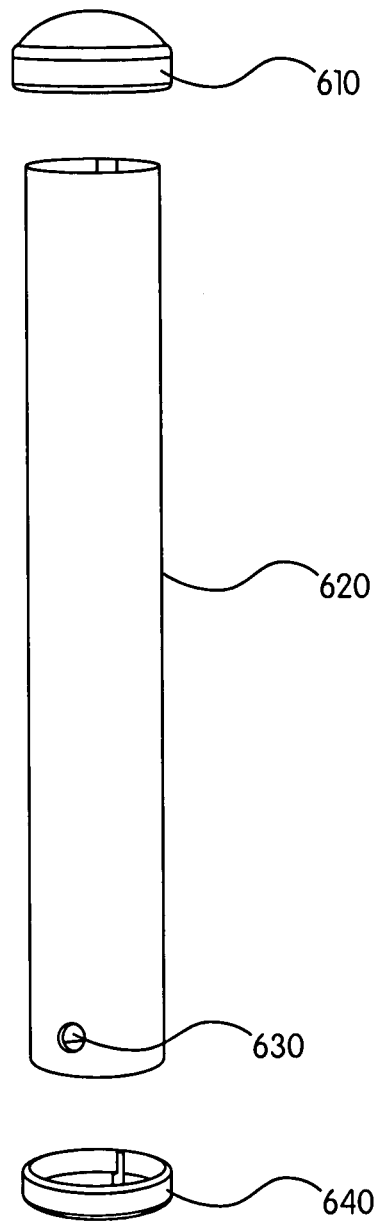

With reference to FIGS. 6(a) and 6(b), a top section of an exemplary snowboard pole according to an exemplary embodiment of the present invention is depicted. FIG. 6(a) is an exemplary top section fully assembled and FIG. 6(b) is an expanded drawing of the top section. With reference to FIG. 6(b) there are visible an end cap 610, a (top) pole section 620, a release button hole 630 and a slider 640. Release button hole 630 can be used by a user, for example, to push on a release button and thus allow the pole to be collapsed. When the pole is fully extended, for example, such a release button can, for example, protrude through release button hole 630 and thus maintain the top section of the snowboard pole in its fully extended position.

Figure 7A:
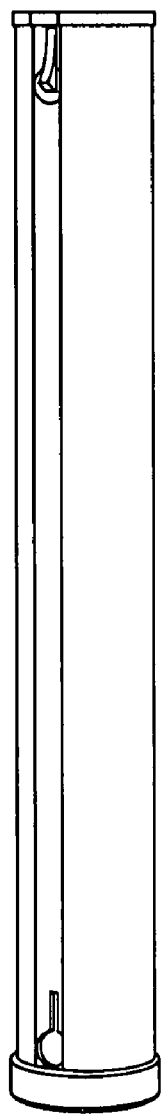
FIGS. 7(a)-(b) depict a middle section of an exemplary snowboard pole according to an exemplary embodiment of the present invention in assembled and expanded views.
Figure 7B:
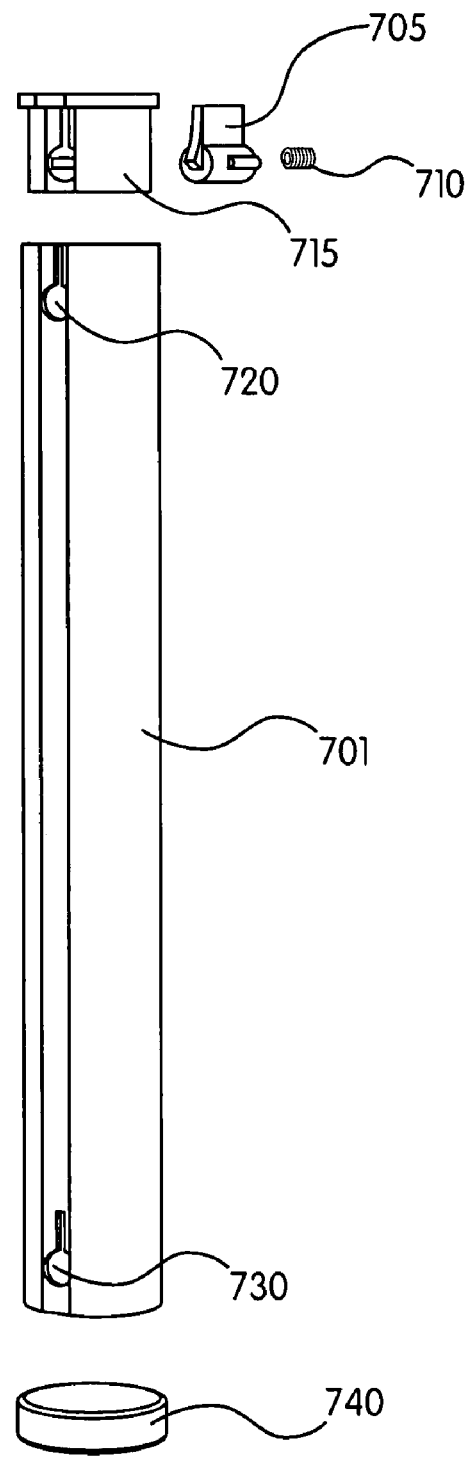

FIGS. 7(a)-(b) depict an exemplary middle pole section 701 of a snowboard pole according to an exemplary embodiment of the present invention. There can be any number of middle sections as is desired to achieve an appropriate length. In exemplary embodiments of the present invention there can be, for example, four such middle sections. An exemplary middle section is depicted in assembled form in FIG. 7(a) and in an expanded view in FIG. 7(b).

Figure 23:
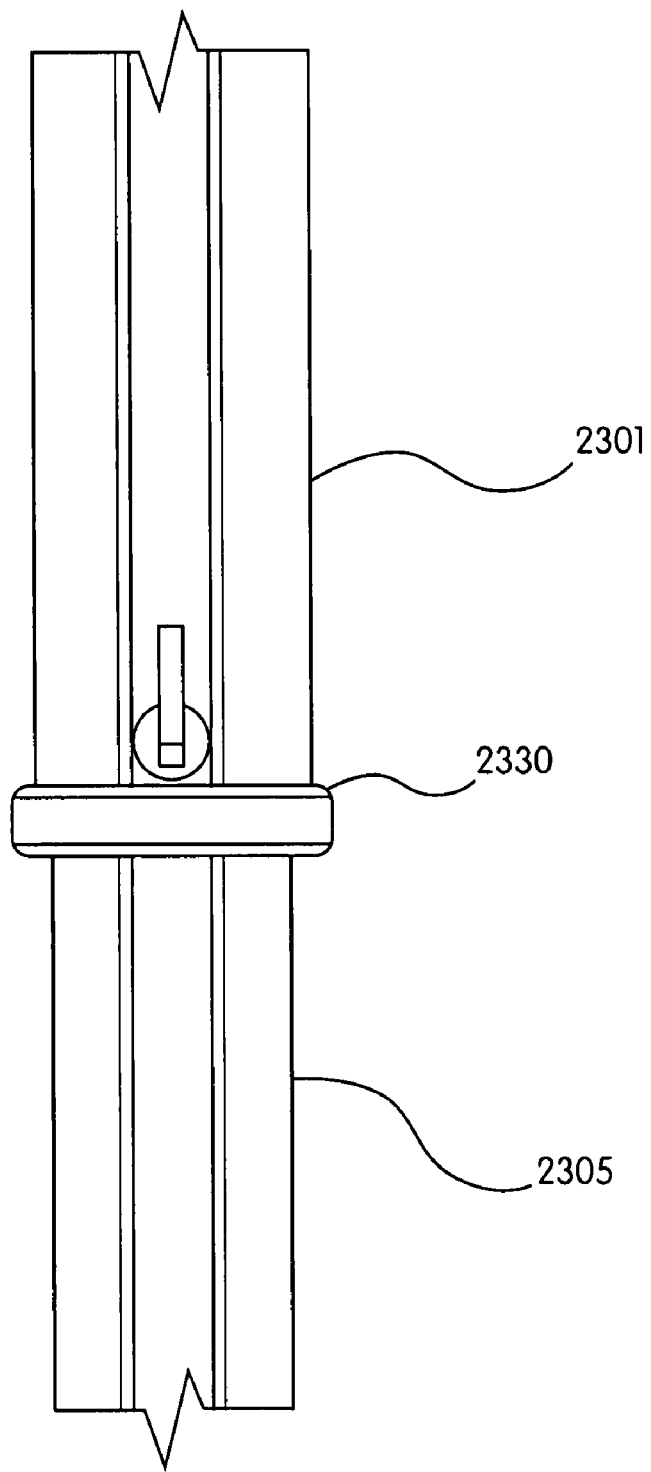
FIG. 23 depicts a detailed view of a junction between two respective sections of an exemplary snowboard pole according to an exemplary embodiment of the present invention.

With reference to FIG. 7(b), at the top of the figure there is shown a locking pin 705 which can, for example, be springloaded by spring 710, and a locking end cap 715, in which locking pin 705 and spring 710 can be provided. Locking end cap 715 can be provided, for example, at top of (middle) pole section 701, and can be the mechanism by which the locking pin 705 of the given section can fit through upper locking pin hole 720 and into a lower locking pin hole of an immediately higher (outer) pole section (not shown) at full extension. Thus, there is also shown a lower locking pinhole 730 in the bottom of the exemplary middle pole section 701 into which the locking pin of an immediately lower (inner) pole section can protrude. FIG. 23, for example, shows a detailed view of a locking pin of a smaller diameter middle section 2305 (top of figure) protruding through a locking pin hole of a larger diameter section 2301 (bottom of figure). With reference thereto, locking pin 2330, associated with section 2305, protrudes through an upper hole of section 2305 and a lower locking pin hole of section 2301.

Thus, each middle pole section can have two locking pin holes, one at the top of the section and another at the bottom. It is by such an exemplary mechanism that the pole sections can be held in place and mutually connected at full extension. Finally, for example, with reference to FIG. 7, there can be a slider 740 affixed to bottom of middle section 701 and it can, for example, slide up or down along the groove in the immediately next lower section, which would be either below or inside the depicted middle section 701 depending on whether the two sections are in a state of relative compression or relative expansion. In collapse, as slider 740 moves down the groove in the next inner (or next lower) section, the slider ultimately pushes in the locking pin of the next lower section and causes the next lower pole section to begin sliding downward on its relative next lower section, as described below. In expansion, a slider can slide upward along the length of the next lower section until the locking pin in the locking end cap of such next lower section protrudes through lower locking pin hole 730 and ultimately locks therein at a state of full relative expansion.

FIGS. 8(a) and 8(b) depict an exemplary bottom section 801 of a snowboard pole according to an exemplary embodiment of the present invention. Shown are a locking pin hole 805 at the top of the exemplary bottom section 801, a basket locating groove 810, and a two-fingered basket 820. Additionally provided are a plastic tip 830, comprising a basket groove 815 and two, for example, plastic, tip locking prongs 840 which can be used, for example, in docking a snowboard pole on a snowboard, as described above.

Figure 10A:
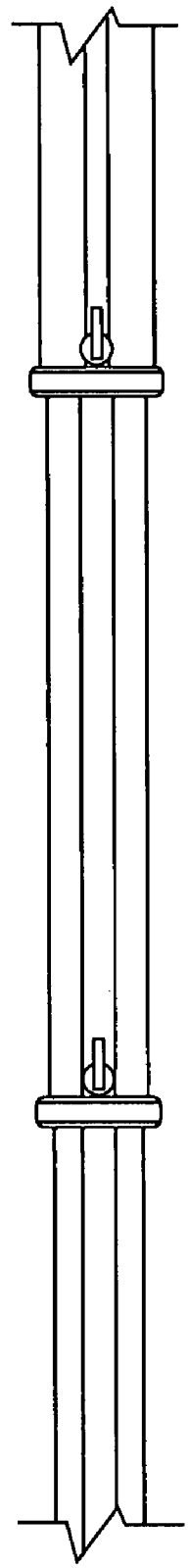
FIGS. 10(a)-(b) show the middle sections of an exemplary snowboard pole according to an exemplary embodiment of the present invention in a fully extended pose.
Figure 10B:
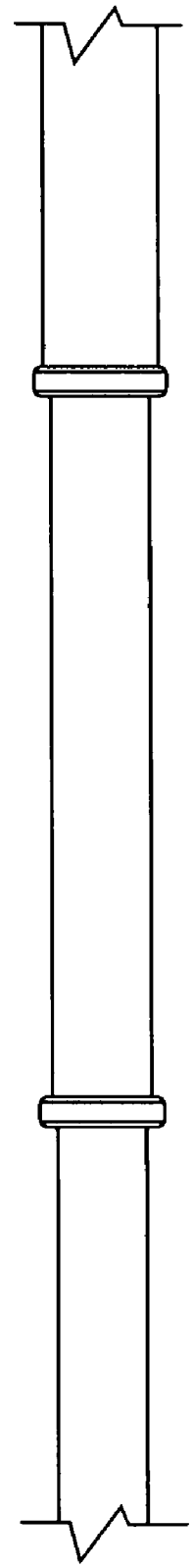
Figure 11A:
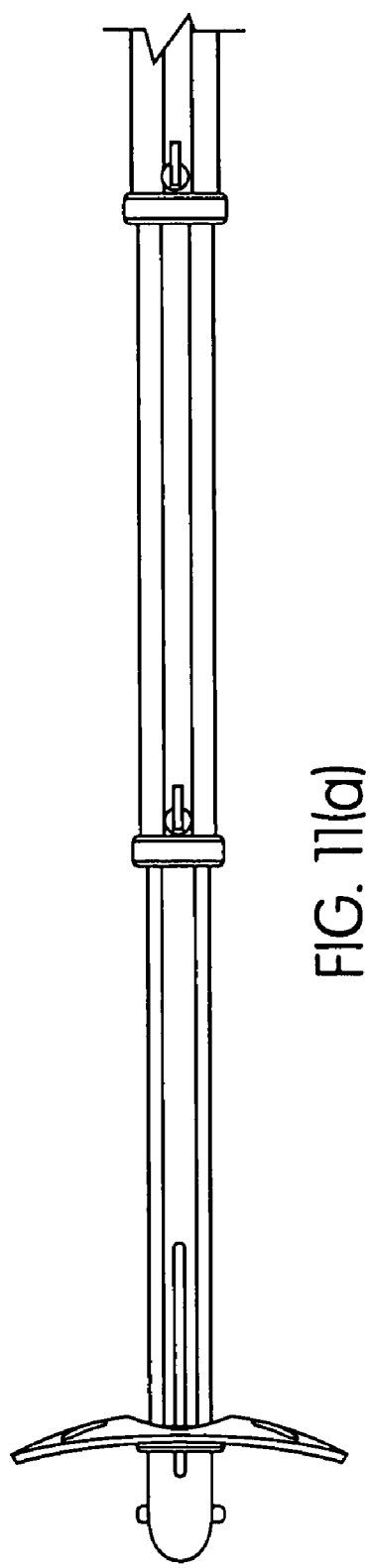
FIGS. 11(a)-(b) show a bottom section of an exemplary snowboard pole according to an exemplary embodiment of the present invention in a fully extended pose.
Figure 11B:
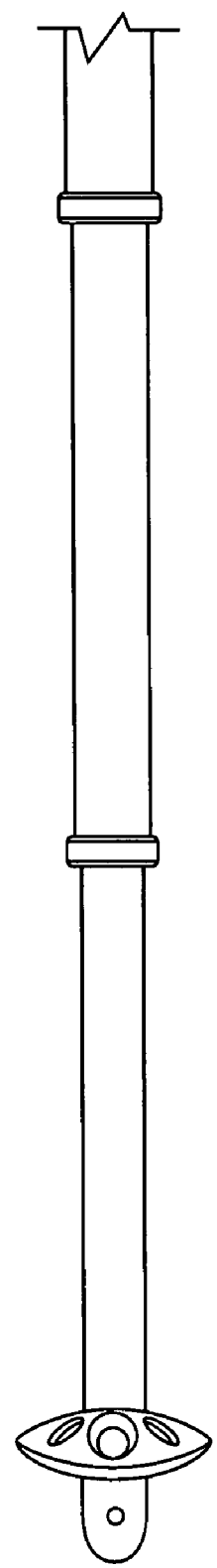

FIGS. 9 through 11 are side views of each of the two sides of an exemplary snowboard pole according to an exemplary embodiment of the present invention in its fully extended state. Because it was desired to depict an exemplary snowboard pole having a top section, four middle sections and a bottom section fully extended, it was necessary to split this drawing into three drawings at this level of detail. FIGS. 14(d) and 14(e) show the fully extended pole in one drawing at a lower magnification. FIGS. 9(a), 10(a) and 11(a) collectively show the top, middle and bottom sections of the grooved side of an exemplary snowboard pole, and FIGS. 9(b), 10(b) and 11(b) show the smooth side of the exemplary snowboard pole. On the grooved side are provided grooves wherein the sliders of each section can, for example, slide down to contact the slider at the bottom of the subsequent (or more inner section), when collapsing the snowboard pole. The smooth side, depicted in FIGS. 9(b), 10(b) and 11(b) has no grooves. However, since the release button in the top section cannot be on the same sides as the grooves it does protrude, as shown in FIG. 9(b), as indicated by index number 910, opposite the groove side of the exemplary snowboard pole. FIG. 11 also depict exemplary dimensions of an exemplary snowboard pole showing that the width of the basket can be, in an exemplary embodiment, 1.35 inches, and the height, or long dimension of the basket can be, for example, 3.60 inches, in an exemplary embodiment of the present invention. The exemplary depicted snowboard pole itself can be, for example, 42.72 inches, as shown in FIG. 10, at full extension, in an exemplary embodiment of the present invention. A plethora of other dimensions can be used as may be desirable in various contexts and for various sizes.

Figure 12A:
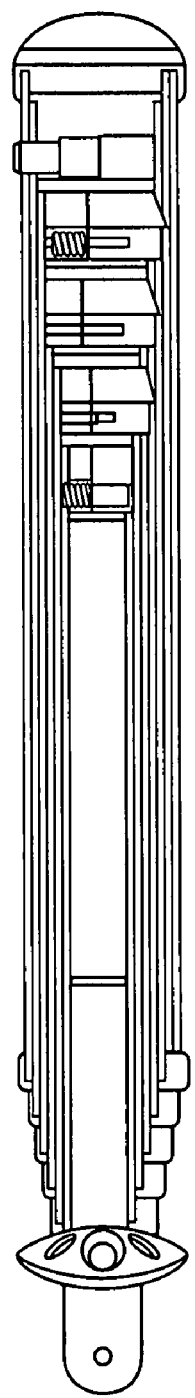
FIGS. 12(a)-(b) show head-on and perspective views, respectively, of a fully collapsed exemplary snowboard pole according to an exemplary embodiment of the present invention.
Figure 12B:
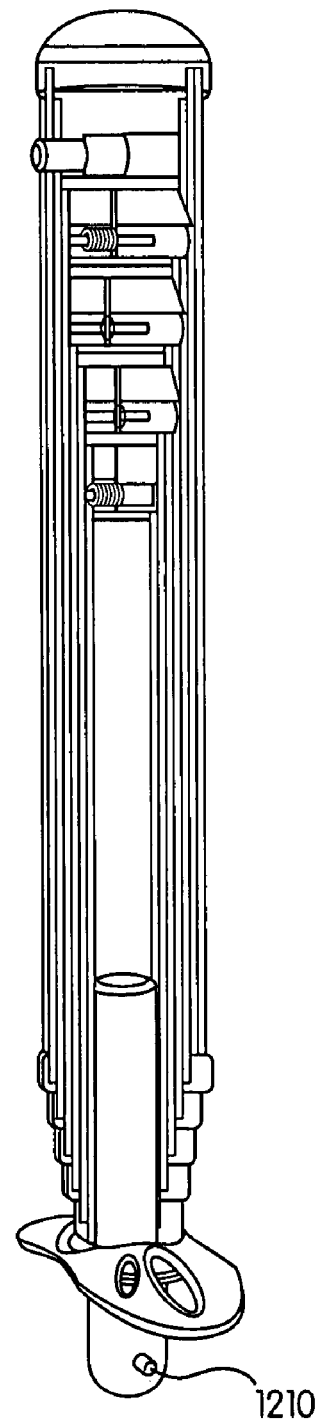

FIG. 12 depict the exemplary snowboard pole of FIGS. 9-11 fully compressed. Shown are the four middle sections, as well as bottom section and the top section collapsed around one another concentrically. Also visible is plastic tip 1210, with reference to FIG. 12, which is also depicted as element 830, with reference to FIG. 8(b). FIG. 12 also depicts an exemplary height of the fully compressed pole as 11.145 inches in the depicted exemplary embodiment.

Figure 13E:
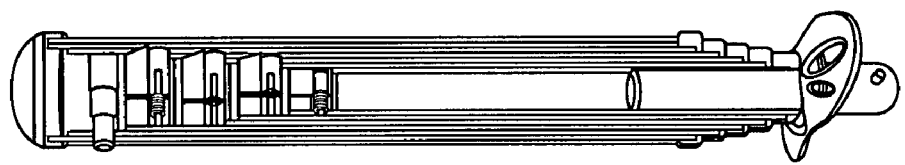
FIGS. 13(d)-(e) are cross sections of an exemplary snowboard pole in its collapsed configuration showing the concentric cylindrical sections of the pole and how they fit together one inside the other according to an exemplary embodiment of the present invention.
Figure 13D:
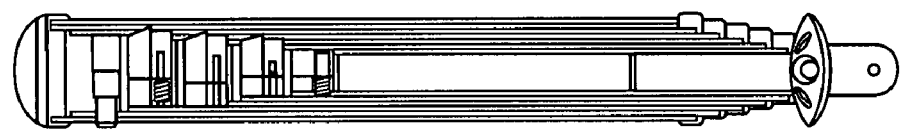
Figure 13A:
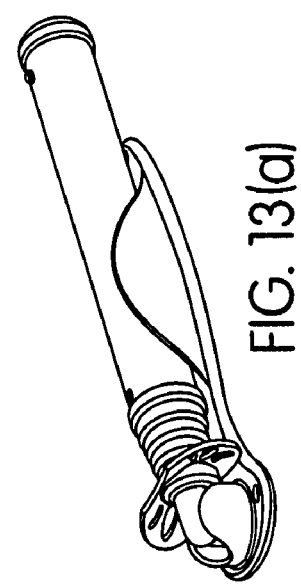
FIGS. 13(a)-(c) show an exemplary snowboard pole in perspective view, top view, and side views, respectively, according to an exemplary embodiment of the present invention.
Figure 13B:
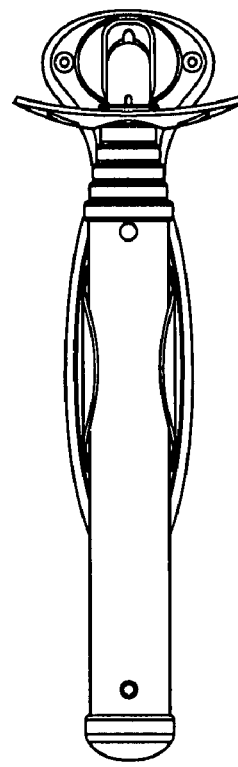
Figure 13C:
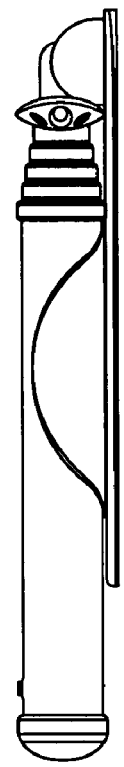

FIGS. 13(a)-(c) show an exemplary fully collapsed snowboard pole in perspective view, top view, and side views, respectively, according to an exemplary embodiment of the present invention. FIGS. 13(d)-(e) are cross sections of the exemplary snowboard pole of FIGS. 13(a)-(c) showing the concentric cylindrical sections of the pole and how they fit together one inside the other according to an exemplary embodiment of the present invention.

FIG. 14 are smaller versions of FIGS. 6-12. Thus, FIGS. 14(a), (b) and (c) each show expanded views of the bottom, middle, and top sections, respectively, of an exemplary snowboard pole according to an exemplary embodiment of the present invention, corresponding to FIGS. 8, 7 and 6, respectively. FIGS. 14(d) and 14(e) show top and side views, respectively, of a fully extended exemplary snowboard pole according to an exemplary embodiment of the present invention, corresponding to FIGS. 9-11.

FIGS. 15(a)-15(c) is a smaller version of FIGS. 3, 4 and 5, shown all together for context. FIGS. 15(a)-15(c) correspond to FIGS. 4(a)-4(c), respectively, FIGS. 15(d)-15(f) correspond to FIGS. 3(a)-3(c), respectively, and FIGS. 15(g)-15(i) correspond to FIGS. 5(a)-15(c), respectively.

For further illustration, FIGS. 16-41 depict various views of an actual exemplary snowboard pole according to an exemplary embodiment of the present invention. The depicted exemplary pole has been constructed according to the design depicted in FIGS. 1-15. These figures are next described.

FIG. 16 depicts an exemplary snowboard pole in a docked position on an exemplary snowboard according to an exemplary embodiment of the present invention. Shown are a handle 1601, a docking mechanism 1610, a forward portion of the docking mechanism 1611, a two fingered basket 1620, and a pole tip 1630.

FIG. 17 is a wider angle view of FIG. 16, and FIG. 18 is a perspective view showing the entire exemplary snowboard. FIG. 19 is an alternative view of the exemplary snowboard pole of FIG. 18, where the view is rotated 180 degrees.

Figure 20:
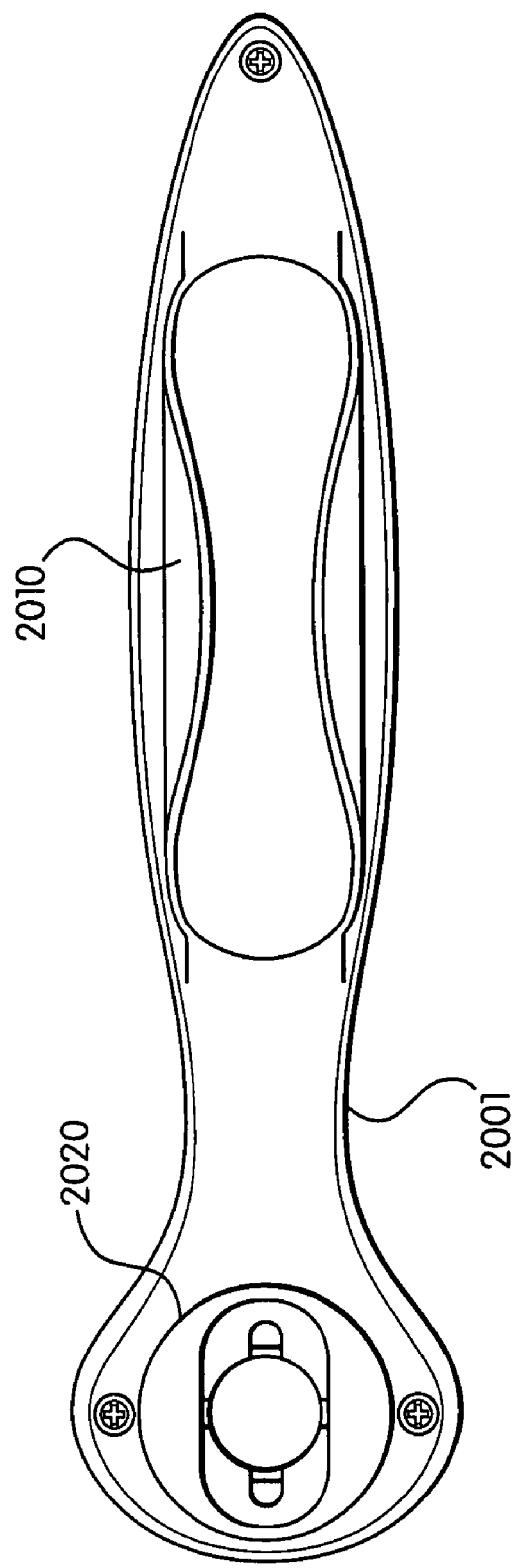
FIG. 20 is a detailed view of an exemplary docking mechanism according to an exemplary embodiment of the present invention.

FIG. 20 depicts a detailed view of an exemplary docking mechanism 2001 according to an exemplary embodiment of the present invention. Shown are a forward portion of the docking mechanism 2020, where a tip of an exemplary pole can be secured during storage, as described above. The two ring structure is provided by this forward portion 2020 in which the grooves are also provided. A rear portion 2010 is also shown, where a handle of an exemplary snowboard pole according to exemplary embodiments of the present invention can be held without clamp or other locking hardware.

Figure 21:
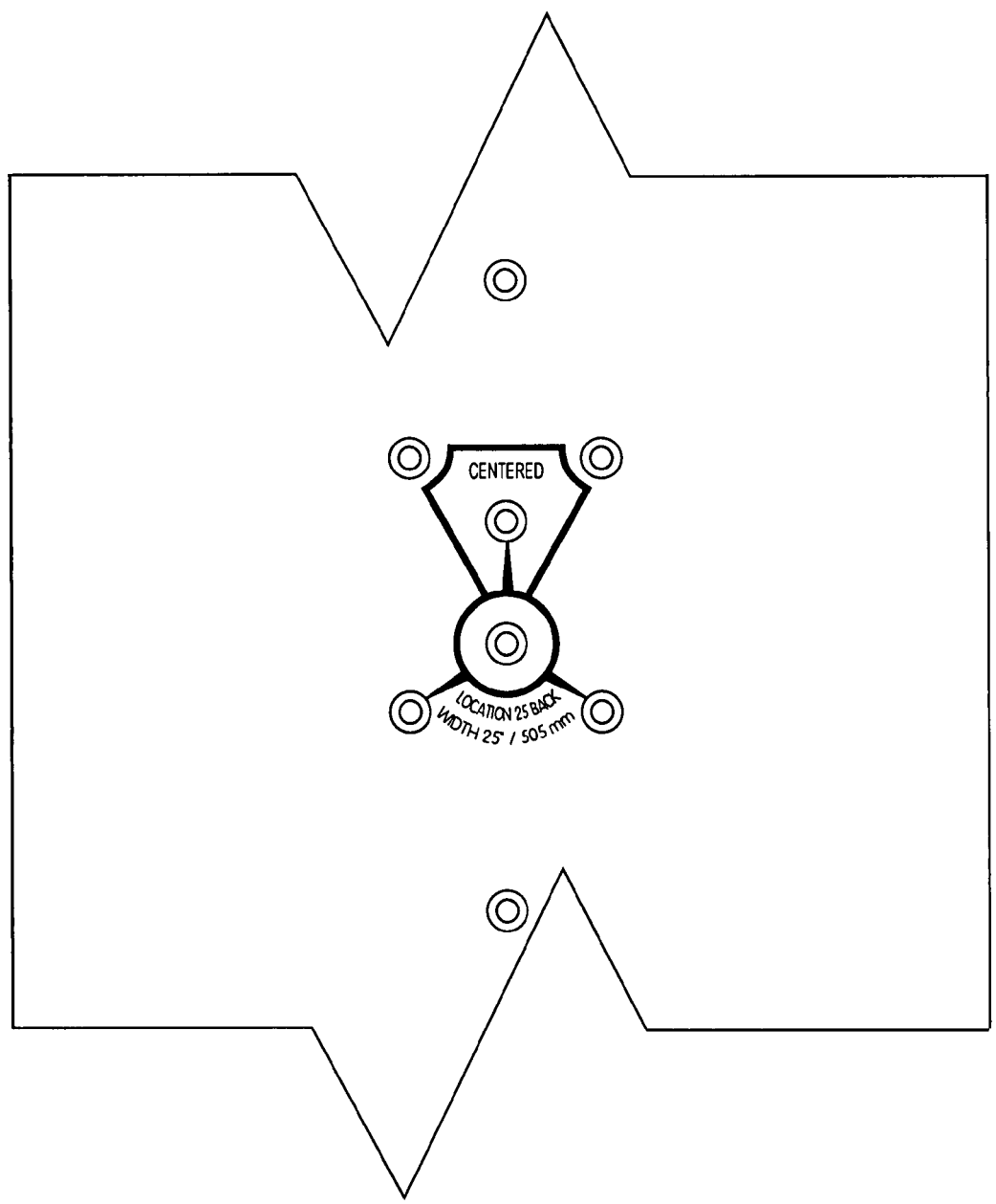
FIG. 21 is a detailed view of exemplary built-in screw seats used for fixing a boot in an exemplary snowboard.

FIG. 21 is a detailed view of exemplary built-in screw seats used for fixing a boot in an exemplary snowboard in exemplary embodiments where a docking mechanism is separately manufactured and attached to a snowboard.

Figure 22:
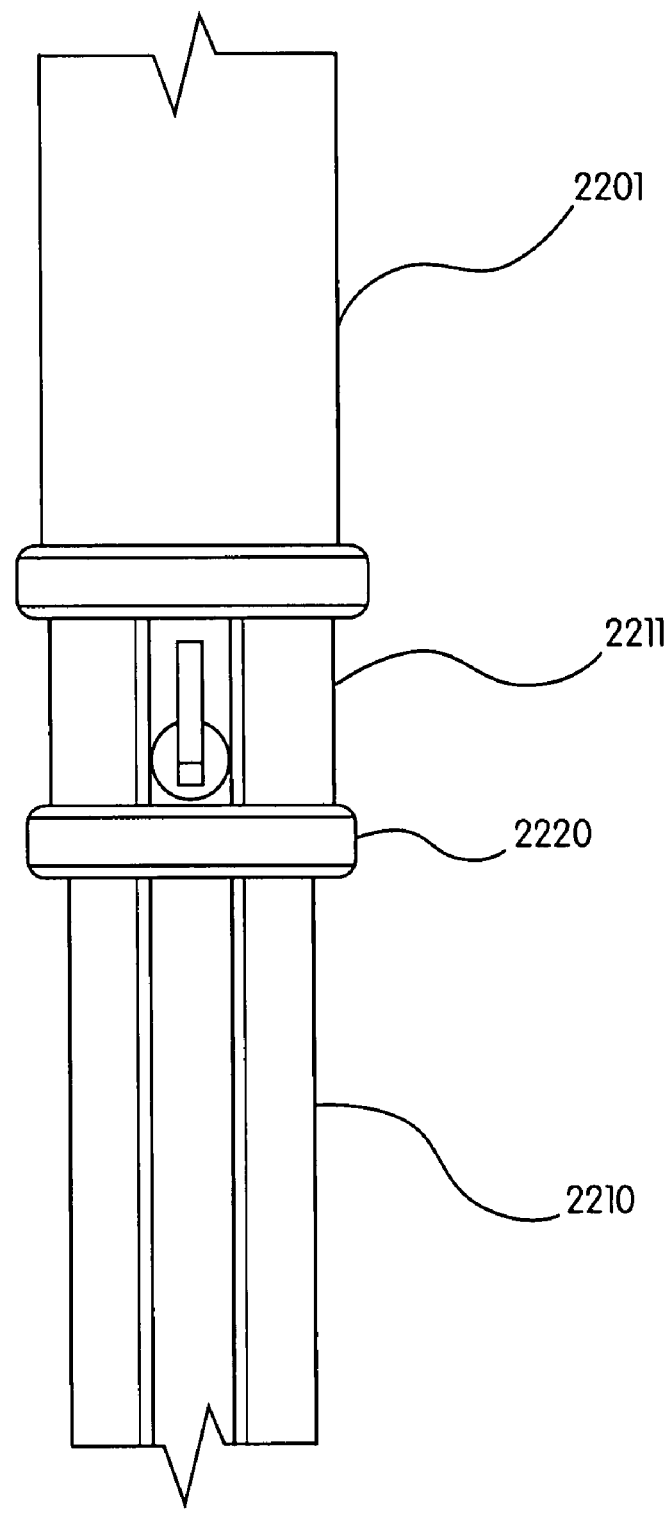
FIG. 22 depicts a detailed view of the top three sections of an exemplary snowboard pole according to an exemplary embodiment of the present invention.

FIG. 22 depicts a detailed view of the top (upper) three sections of an exemplary snowboard pole according to an exemplary embodiment of the present invention. Top section 2201 is shown, with two middle sections, 2210 and 2211. The lowest shown middle section 2210 is somewhat extended, and slider 2220 of upper middle section 2211 is shown as well. Slider 2220 has almost covered the locking pin of section 2211, and thus top section 2201 nearly completely covers first middle section 2211.

FIG. 23 depicts a detailed view of a junction between two respective sections of an exemplary snowboard pole according to an exemplary embodiment of the present invention. Shown are two middle sections of an exemplary pole, an upper middle section 2301 and a lower middle section 2305. Locking pin 2330, associated with section 2305, is also shown.

Figure 24:
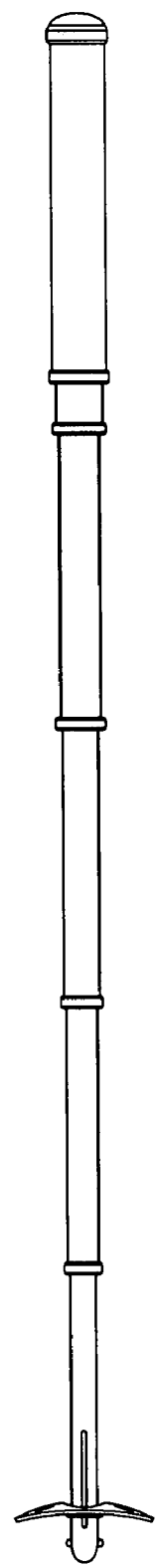
FIG. 24 shows an exemplary snowboard pole almost fully extended according to an exemplary embodiment of the present invention, where the basket has not yet been deployed to its upright position.
Figure 25:
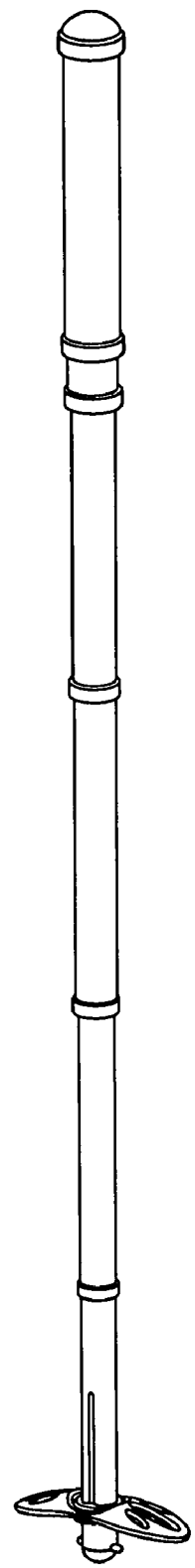
FIG. 25 is an alternative view of the exemplary snowboard pole of FIG. 24.

FIG. 24 shows the exemplary snowboard pole almost fully extended according to an exemplary embodiment of the present invention. The basket has not yet been deployed to its upright position. FIG. 25 is an alternative view of the exemplary snowboard pole of FIG. 24.

FIG. 26 depicts an exemplary snowboard pole 2610 in a collapsed state, rotated upwards from a docked position to a fully vertical position. The pole tip is still engaged in the forward portion 2621 of docking mechanism 2620, and thus has not yet been rotated about its central axis (where the fingers of the basket would be parallel to the longitudinal axis of the docking mechanism 2620, as opposed ot perpendicular to it as shown) so as to remove it from the docking mechanism.

FIG. 27 is a close-up view of the exemplary snowboard pole 2710 depicted in FIG. 26. The basket 2740 has its fingers still perpendicular to the longitudinal axis of docking mechanism 2720, and thus the tip locking prongs are still in the second pair of grooves in forward portion 2721 of docking mechanism 2720, as a result of having rotated thereto when the pole was fully docked. FIG. 28 depicts the exemplary snowboard pole of FIG. 27 from another direction, looking from behind the vertical pole from the other side of the snowboard. FIG. 29 depicts the exemplary snowboard pole of FIGS. 27 and 28, where the snowboard pole has now been rotated about its central axis so as to be removable from the docking mechanism, according to an exemplary embodiment of the present invention. Thus the fingers of the basket have been rotated back to the position they had when the pole tip was first inserted in the forward portion of the docking mechanism, the tip locking prongs are now in the first set of grooves (at 12 and 6 o'clock from a perspective on top the pole looking down along the pole's central axis), and the fingers are now parallel to the longitudinal axis of the docking mechanism. FIG. 30 is a detailed view of the exemplary snowboard pole of FIG. 29. Shown are the exemplary pole 3010, the basket 3040, the docking mechanism 3020 and the forward portion thereof 3021.

Figure 31:
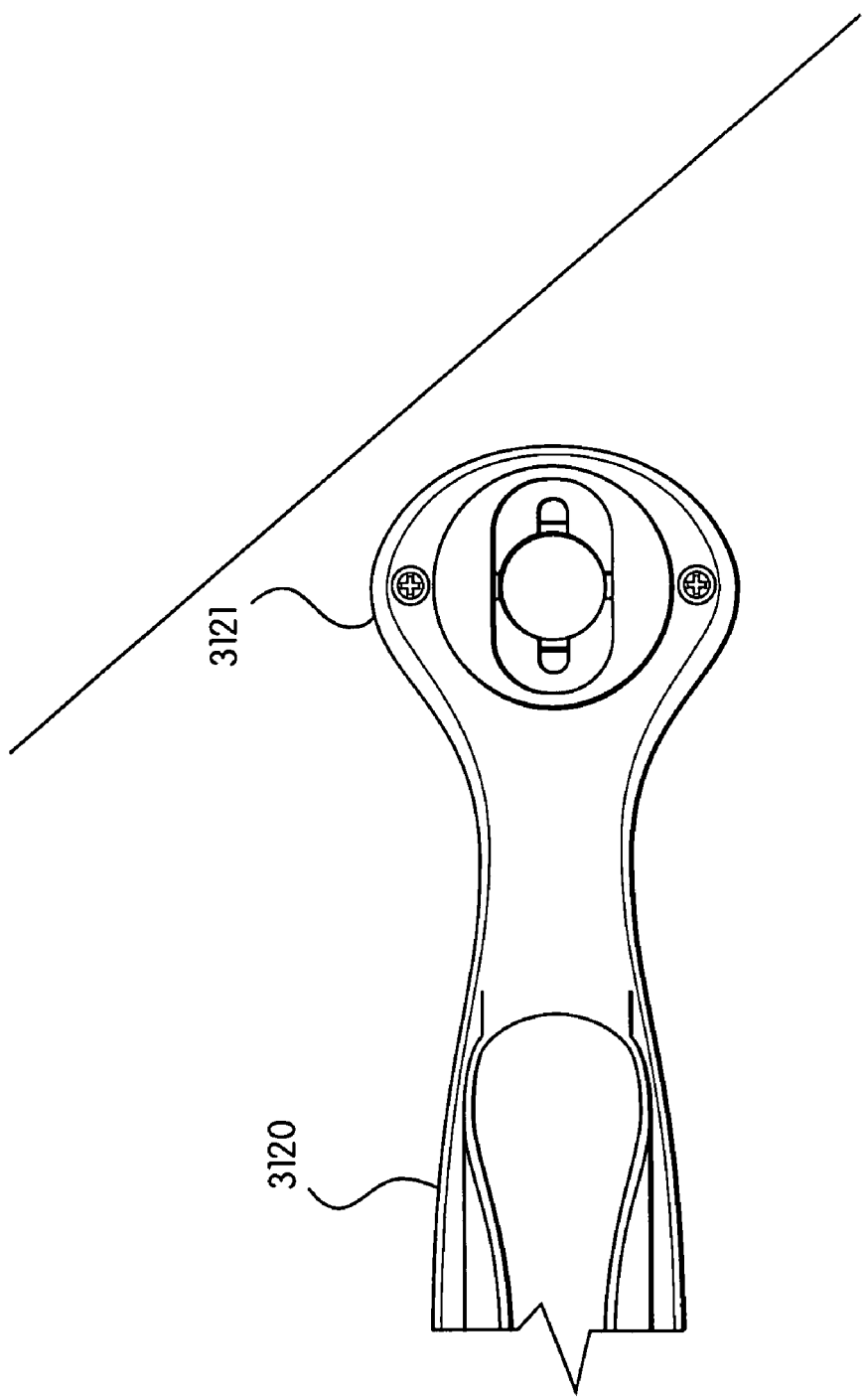
FIG. 31 is a detailed view of the docking mechanism of an exemplary snowboard pole according to an exemplary embodiment of the present invention showing the grooves into which an exemplary snowboard pole can be inserted prior to rotation and locking.
Figure 32:
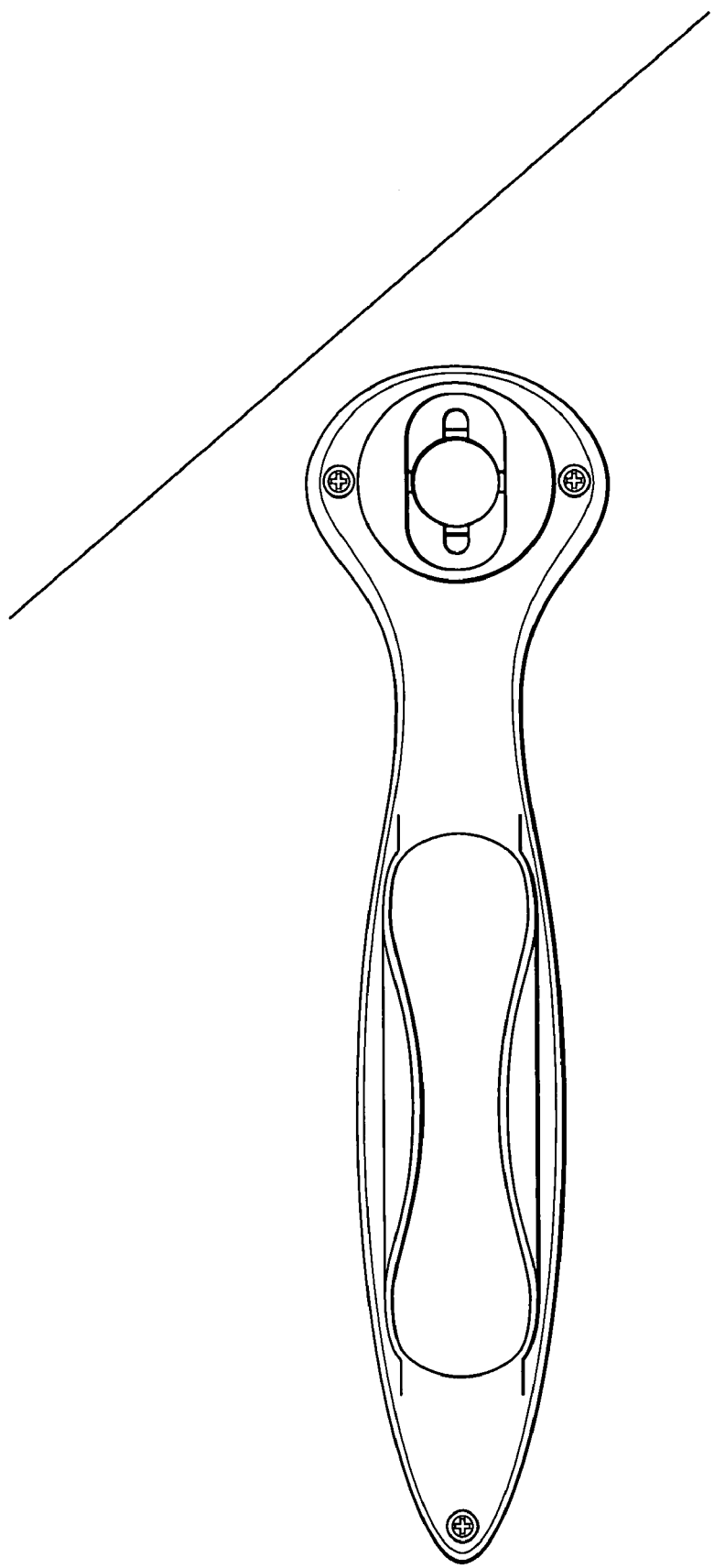
FIG. 32 is a wider angle view of the docking mechanism of FIG. 31 showing the entire length of the docking mechanism.

FIGS. 31-34 are detailed views of the empty docking mechanism. FIG. 31 is a detailed view of the forward portion 3121 of docking mechanism 3120 of the exemplary snowboard pole. In FIG. 31 the grooves into which an exemplary snowboard pole can be inserted prior to rotation and locking, and on eof the grooves at the final rotational position of the pole can be seen as well. FIG. 32 is a view of the docking mechanism of FIG. 31 showing its entire length. FIG. 33 is a detailed view of the forward portion 3321 of the exemplary docking mechanism of FIGS. 31 and 32. Shown in FIG. 33 are the first set of grooves (i.e., the first ones into which the pole is inserted in docking, being the ones in which the fingers of the basket sit parallel to the longitudinal axis of the docking mechanism, as shown in FIG. 29) 3325. Grooves 3325, as noted above, are at 12 o'clock and 6 o'clock positions looking from above the docking mechanism down onto it (from the left side of FIG. 33). Grooves 3326, the second set of grooves (i.e., at the second and final rotational position of the pole when fully docked in forward portion 3321 of the docking mechanism) are thus at clock positions 3 o'clock and 9 o'clock from the said viewpoint. Grooves 3325 and 3326 are housed in the ring structure housing 3322 of the forward portion 3321 of the docking mechanism.

Figure 34:
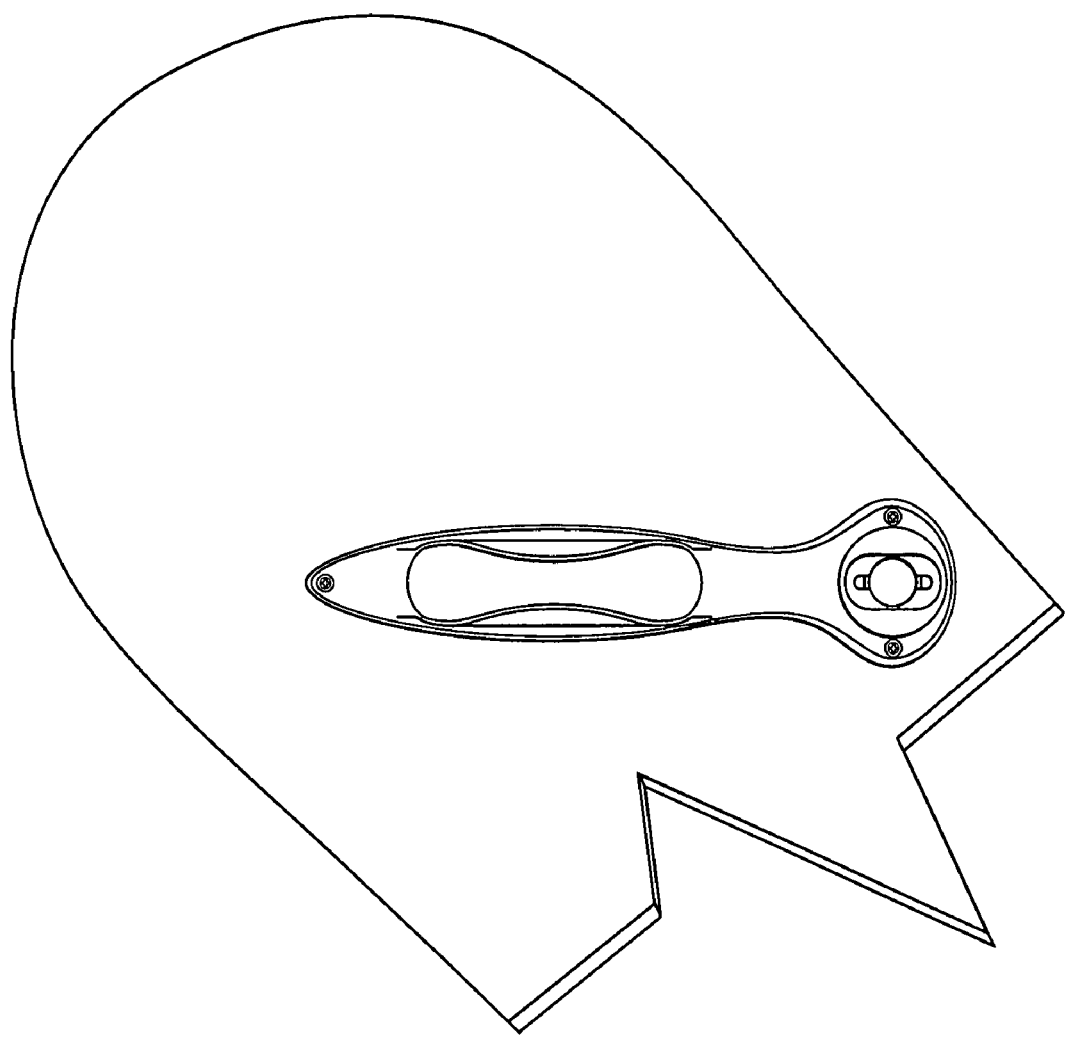
FIG. 34 is a view of the docking mechanism of FIG. 31-33 showing the entire length of the docking mechanism and the rear of the snowboard.

FIG. 34 is wider angle a view of the docking mechanism of FIG. 31-33 showing the entire length of the docking mechanism and the rear of the snowboard.

Figure 35:
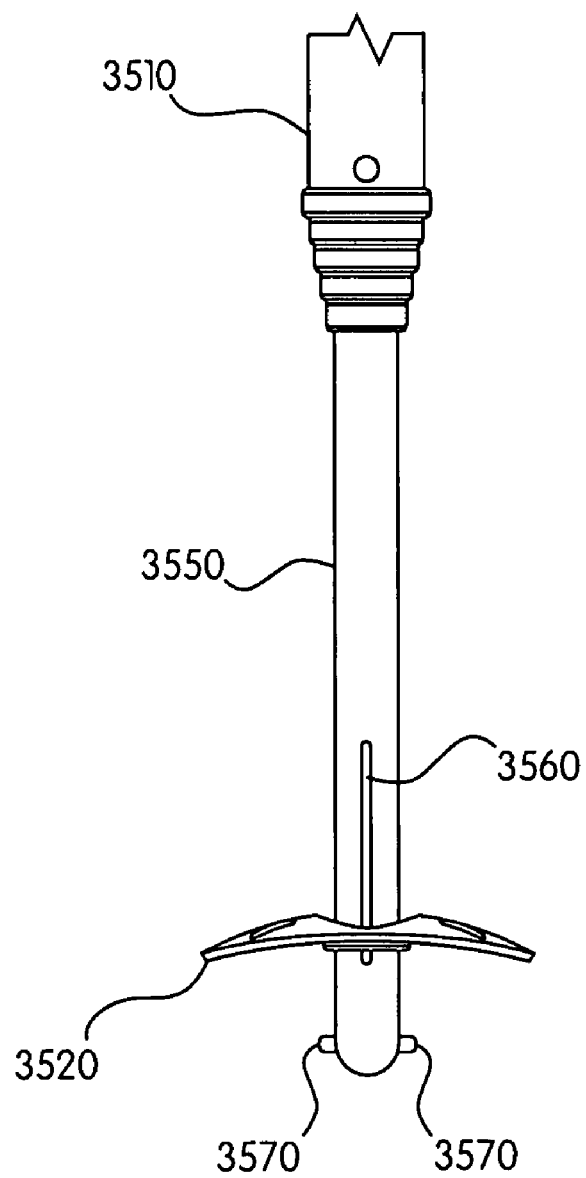
FIG. 35 depicts an exemplary snowboard pole according to an exemplary embodiment of the present invention with the lowest section extended but the basket not yet deployed upwards.

FIG. 35 depicts a detailed view of the bottom section 3550 of the exemplary snowboard pole 3510 where the lowest section has been extended but basket 3520 has not yet been deployed upwards along its groove 3560 (which is actually a combination of basket groove 815 and basket locating groove 810, with respect to FIG. 8, when plastic tip 830 is inserted into bottom pole section 801, again with respect to FIG. 8) to its operational position. Tip locking prongs 3570 are clearly shown in the figure.

Figure 36:
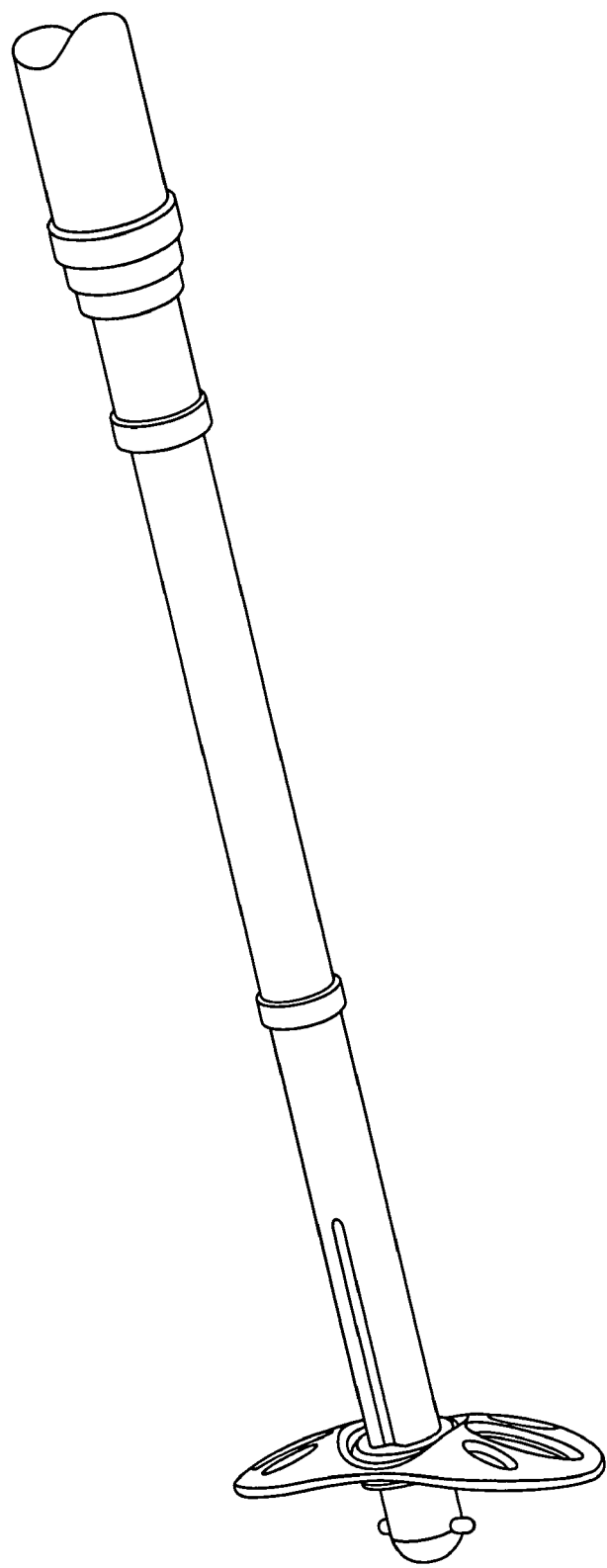
FIG. 36 depicts the exemplary snowboard pole of FIG. 35 where the bottom, the lowest middle section and a portion of the next to lowest middle section have been extended.

FIG. 36 depicts a wider angle view of the exemplary snowboard pole of FIG. 35 where the bottom section, the lowest middle section and a portion of the next higher middle section have been extended.

Figure 37:
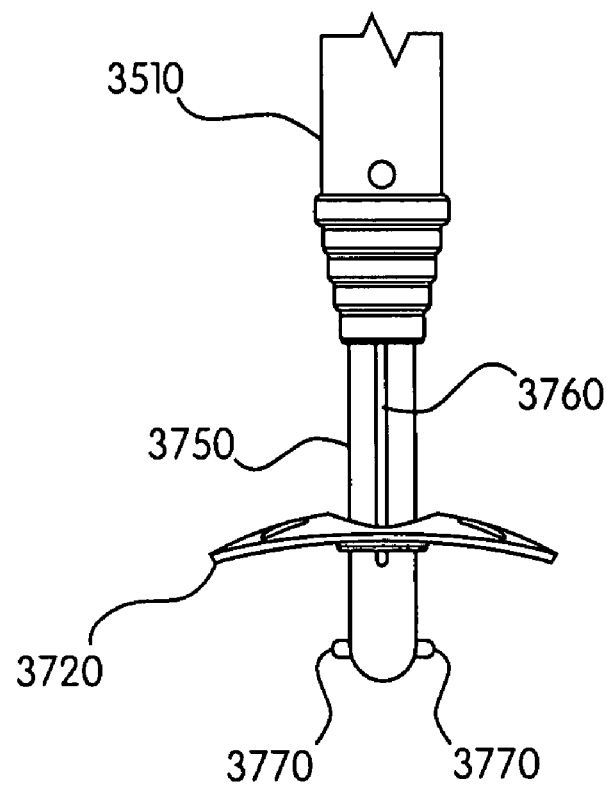
FIG. 37 depicts a detailed view of the exemplary snowboard pole of FIG. 35 where the lowest section has been only slightly extended and the basket is in its storage or lower position.
Figure 38:
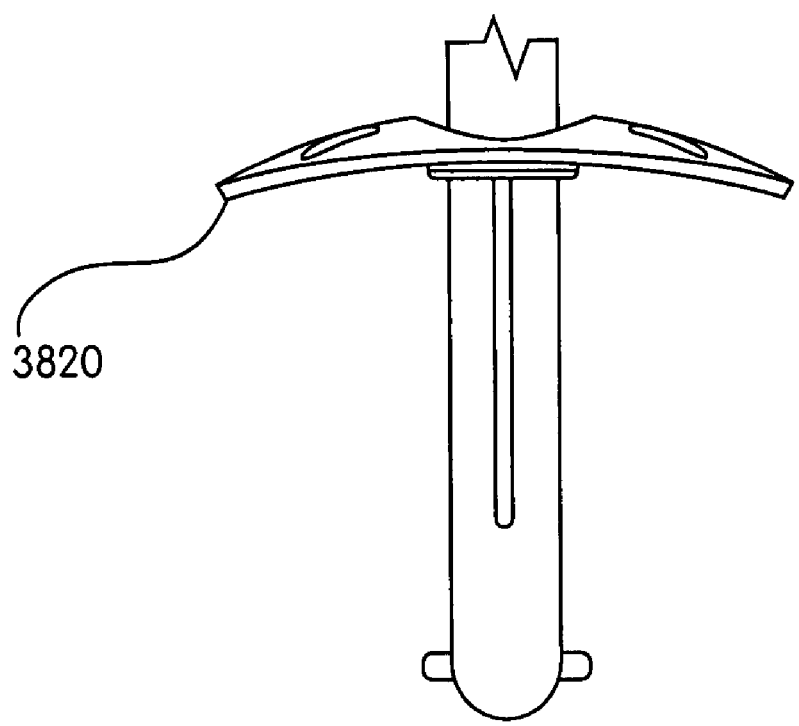
FIG. 38 depicts the exemplary snowboard pole of FIG. 37 with the basket fully deployed to its upper position.
Figure 39:
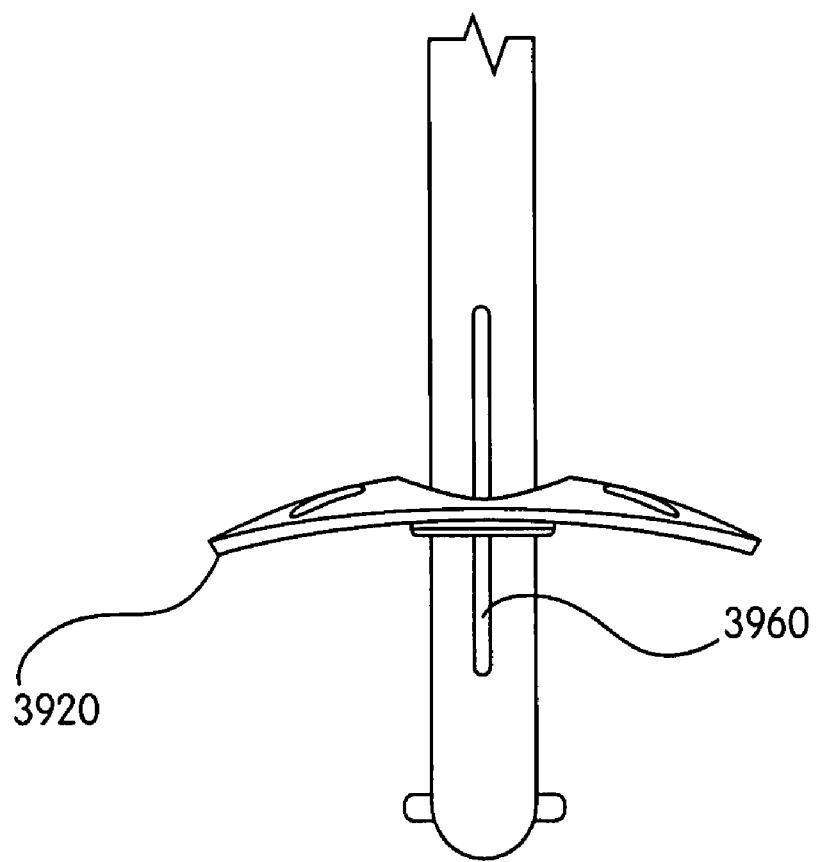
FIG. 39 depicts the exemplary snowboard pole of FIG. 38 with the basket partially extended between its storage position and its use position according to an exemplary embodiment of the present invention.

FIG. 37 depicts a detailed view of the exemplary snowboard pole of FIG. 35 where the lowest section has been only slightly extended and the basket is in its storage or lower position. This is essentially the configuration of an exemplary snowboard pole when it is nearly collapsed or just has been removed form a docking mechanism without first being extended while still in the docking mechanism, as described above according to some exemplary embodiments. Shown are the locking tip prongs 3770, the basket 3720 and the basket groove 3760 (actually a combination of basket groove 815 and basket locating groove 810, with respect to FIG. 8, as noted above). FIG. 38 depicts the exemplary snowboard pole of FIG. 37 with basket 3820 fully deployed to its upper position. Finally, FIG. 39 depicts the exemplary snowboard pole of FIGS. 37-38 with basket 3920 partially extended between its (distal) storage position and its (proximal) use position according to an exemplary embodiment of the present invention.

Figure 40:
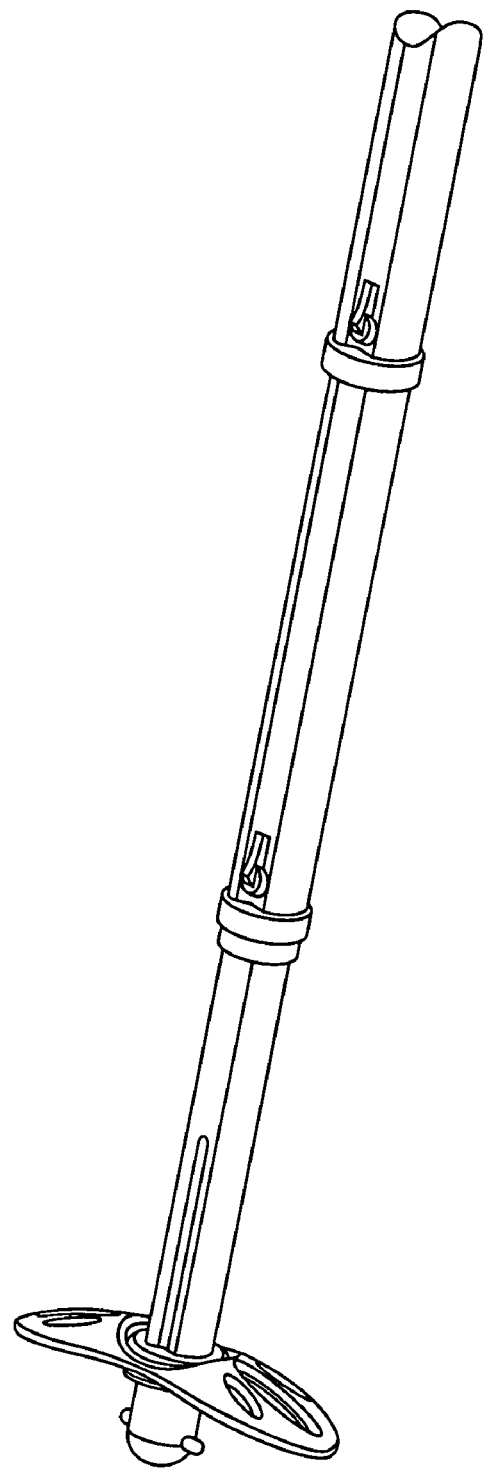
FIG. 40 depicts a perspective top view of an exemplary snowboard pole according to an exemplary embodiment of the present invention in a nearly fully extended state.
Figure 41:
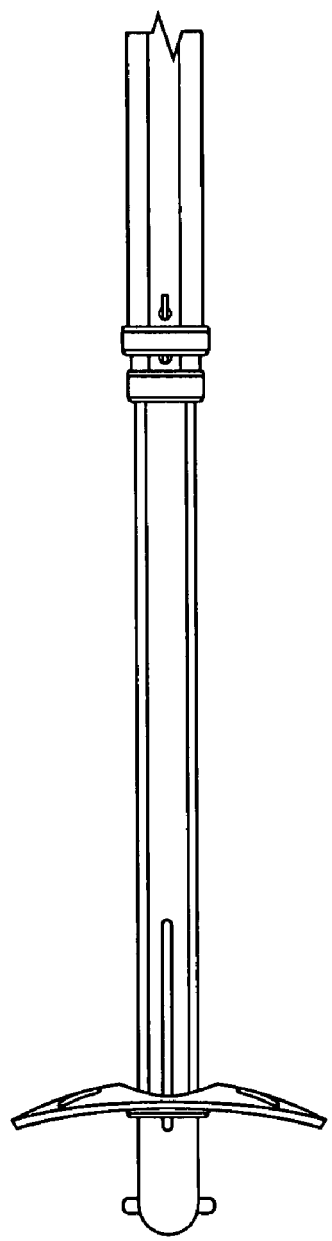
FIG. 41 depicts another view of the exemplary snowboard pole of FIG. 40.

FIG. 40 depicts a perspective top view of the exemplary snowboard pole in a nearly fully extended state, but where the basket is still in the distal position and the bottom section. FIG. 41 depicts a closer overhead view of the configuration of FIG. 40.

Thus, as depicted, for example, in the various figures, and as described above, in exemplary embodiments of the present invention a snowboard pole can have, for example, the following features:

Clamping Method

An exemplary snowboard pole can incorporate a board mounted, or board integrated, clamp, which can hold the pole when not in use. Such a mounting method allows a user to have full freedom of movement without any resistance, restriction or feeling of cumbersomeness, as may be present when using a conventional, for example, "user" mounted design.

Board Clamp

An exemplary snowboard pole according to an exemplary embodiment of the present invention can be configured in such a way that the clamp can be mounted in a lateral or longitudinal direction with respect to the snowboard, or at an angle, as depicted in the exemplary embodiment shown in the figures. Further, in exemplary embodiments of the present invention, a snowboard clamp can be designed in such a way that it "grasps" or partially surrounds the snowboard pole when the two interface. This represents a unique feature in that such a mount does not require straps, clips, or any other type of locking mechanism to secure the pole when not in use. A clamp can, for example, be attached to a snowboard, for example, by means of screws, as shown in the figures. In such exemplary embodiments there can be screw seats such as are used for attaching boots, as shown, for example, in FIG. 36 in detail and in FIGS. 16-19. Alternatively, for example, a clamp can be a wholly integrated portion of a snowboard and not need any attachment mechanism at all.

Plastic Tip/Clamp Interface

In exemplary embodiments of the present invention, a snowboard pole can have a tip shaped in such a way (for example, "T-cross shaped") such that when placed into a snowboard mounting clamp, and rotated 90 degrees about the snowboard pole axis, it can lock the snowboard pole in place for mounting. This "tip locking" feature also has the additional benefit of allowing a user to extend the pole with one hand. A user can, for example, remove the handgrip/upper portion of the snowboard pole out of the mounting clamp and pull upwards extending the pole with one hand and in one motion (or, automatically, with "one-click" as described below). A unique shape/interface of the snowboard pole tip and mounting clamp can hold the bottom portion of the pole for the user as he pulls up on the handle end of the pole, thus facilitating this process.

Basket

In exemplary embodiments of the present invention a basket can have two (2) "fingers" opposed to each other in position, unlike many baskets used for ski poles, which have four (4) "fingers" or are circular or "starlike" in shape in exemplary embodiments of the present invention. This design can allow a snowboard pole to be mounted closely to the board as opposed to a four (4) fingered basket which would have one of the fingers interfere between the pole and the board/mount. Additionally, in exemplary embodiments of the present invention, a basket can be provided in a manner that allows it to "slide" up and down vertically, as for example within grooves on the distal portion of the snowboard pole, a predetermined distance. For example, approximately 2-4 inches in exemplary embodiments of the present invention. While the basket can move up and down vertically, it remains fixed so that it does not rotate about the axis of the snowboard pole. This can be accomplished, as noted above, by the use of grooves in a lower pole section along which the basket can slide keeping it in correct rotational orientation vis-a-vis the pole to guarantee that the basket fingers are in proper position for storage at all times. The reason for allowing the basket to move vertically up and down on the pole is that it thus can allow the snowboard pole to become "more" compact (i.e., take up less space) when it is collapsed for mounting on the board, as shown for example, in FIGS. 16 and 17. This adjustment also provides a user with a reasonable amount of pole "tip" below the basket to gain leverage and allow him to push off on snowy surfaces.

Spring Loaded Locking Pin/Sliders

In exemplary embodiments of the present invention, spring loaded locking pins can, for example, be incorporated into exemplary snowboard poles, and can be shaped in a way that allows the entire pole to be collapsed in a "domino effect" by depressing one button on the top pole section, and pushing down on that top section of the pole. The spring loaded locking pins contained in each section below the top can have, for example, a "ramp" (i.e., a grade which increases from near flush at the top of the "ramp" to beyond the full horizontal protrusion of the locking pin) designed into their form, as shown, for example, in FIG. 5 and in FIG. 23, and thus allow the "slider" from the immediately higher section to push the locking pin "in," thus releasing the next lower pole section and allowing it to be collapsed.

Automatic "One-Click" Extension

In exemplary embodiments of the present invention, a user can utilize an automatic "one-click" extension method to extend an exemplary snowboard pole. In such exemplary embodiments, the sections of the snowboard pole can be spring loaded using techniques as are known in the art to allow for the entire snowboard pole to be extended automatically by simply pressing a button on the top section. It is contemplated that a button placed near 910 with respect to FIG. 9(*b*) could be pressed and that the snowboard pole would automatically extend in the manner that automatic umbrellas and other devices comprising concentric cylindrical sections are extended using conventional techniques. It is contemplated that in some exemplary embodiments of such an automatic extension capability modifications will be made to the size (for example, diameter) of the various sections of the exemplary snowboard pole. Additional modifications may include changes to the grooving, etc., as may be necessary to spring-load or otherwise outfit the various sections for automatic extension.

Additionally, in alternative exemplary embodiments of the present invention, more sophisticated technologies for automatic one-click extension may be brought to bear to achieve greater power and speed in a one-click automatic extension in exemplary embodiments of the present invention. Such additional technologies can include power sources such as, for example, compressed air or carbon dioxide or the equivalent, in canisters, or, for example solenoids driven by battery power. Such technologies can, for example, be combined in various exemplary embodiments of the present invention with the disclosed exemplary snowboard pole using known techniques.

While this invention has been described with reference to one or more exemplary embodiments thereof, it is not to be limited thereto and the appended claims are intended to be construed to encompass not only the specific forms and variants of the invention shown, but to further encompass such as may be devised by those skilled in the art without departing from the true scope of the invention.

What is claimed:

1. A collapsible snowboard pole, comprising:
    an expandable and compressible shaft;
    a basket provided at a distal end comprising two fingers, spaced approximately 180 degrees apart from each other;
    a handle provided at a proximal end; and
    a tip provided with tip locking prongs at the distal end,
    wherein the basket can slide relative to and along a groove in a bottom section of the shaft between a tip-ward position for storage and a top-ward position for use.

2. The snowboard pole of claim 1, wherein the shaft comprises multiple concentric cylindrical sections.

3. The snowboard pole of claim 2, wherein the multiple concentric cylindrical sections each have a groove provided in one side.

4. The snowboard pole of claim 1, wherein tip locking prongs protrude from opposite sides of the tip and lie in approximately a single line.

5. A collapsible snowboard pole system, comprising:
    a collapsible snowboard pole, comprising:
    a handle, a basket and a tip; and
    a docking mechanism comprising a cylindrical clamp and a ring structure,
    wherein when the snowboard pole is docked the clamp grasps the handle and the tip is held in the ring structure.

6. The system of claim 5, wherein the collapsible snowboard pole is that of claim 1.

7. The system of claim 5, wherein the docking mechanism is provided at the back of a snowboard, either across the width of the snowboard or at an angle.

8. The system of claim 5, wherein the ring structure comprises two sets of grooves.

9. The system of claim 5, wherein in docking, tip locking prongs are inserted into a first set of grooves and the pole is rotated so that the tip locking prongs rest in a second set of grooves.

10. The system of claim 9, wherein the pole is collapsed either prior to insertion in the first set of grooves, prior to rotation into the second set of grooves, or after setting in the second set of grooves.

11. The system of claim 10, wherein the pole is maintained substantially normal to the snowboard surface while inserted in the first set of grooves and being rotated to rest in the second set of grooves.

12. The system of claim 8, wherein the second set of grooves is arranged so as to allow both (i) the pole to be rotated to a substantially normal position relative to the snowboard surface, and (ii) the pole to be extended, when the pole is positioned within said second set of grooves.

13. The system of claim 5, wherein the docking mechanism is an integral part of and formed out of the same material as the snowboard.

14. The system of claim 5, wherein the docking mechanism and the tip of the snowboard are made of either a lightweight metal or metallic alloy, plastic, or carbon fiber.

15. A collapsible snowboard pole system, comprising:
    a collapsible snowboard pole with a handle and a tip; and
    a docking mechanism comprising a clamp and a ring structure,
    wherein the ring structure comprises a first set of grooves and a second set of grooves.

16. The system of claim 15, wherein the tip is provided with tip locking prongs, wherein when docking, the tip locking prongs are inserted into a the first set of grooves and the pole is rotated so that the tip locking prongs rest in the second set of grooves.

17. The system of claim 16, wherein when docking the pole is maintained substantially normal to the snowboard surface while being inserted in the first set of grooves and being rotated to rest in the second set of grooves.

18. The system of claim 15, wherein the second set of grooves is arranged so as to allow the pole to be rotated upward from the snowboard when the pole is positioned within said second set of grooves.

19. The system of claim 15, wherein the first and second set of grooves are offset by ninety degrees from each other.

20. The system of claim 15, wherein the docking mechanism is an integral part of and formed out of the same material as the snowboard.

* * * * *